United States Patent
Von Elm

(10) Patent No.: US 12,153,208 B2
(45) Date of Patent: Nov. 26, 2024

(54) LASER BEAM WAVEFRONT CORRECTION WITH ADAPTIVE OPTICS AND MID-FIELD MONITORING

(71) Applicant: Coherent LaserSystems GmbH & Co. KG, Göttingen (DE)

(72) Inventor: Rüdiger Von Elm, Wielen (DE)

(73) Assignee: Coherent LaserSystems GmbH & Co. KG, Göttingen (DE)

( * ) Notice: Subject to any disclaimer, the term of this patent is extended or adjusted under 35 U.S.C. 154(b) by 987 days.

(21) Appl. No.: 17/102,201

(22) Filed: Nov. 23, 2020

(65) Prior Publication Data

US 2022/0163787 A1 May 26, 2022

(51) Int. Cl.
*G02B 26/08* (2006.01)
*G02B 26/06* (2006.01)
(Continued)

(52) U.S. Cl.
CPC ......... *G02B 26/0833* (2013.01); *G02B 26/06* (2013.01); *H01S 3/005* (2013.01); *H01S 3/08059* (2013.01)

(58) Field of Classification Search
CPC .......................... G02B 26/0833; G02B 26/06; G02B 26/0825; G02B 27/0068; G02B 27/108; H01S 3/005; H01S 3/08059; H01S 3/0092; H01S 3/0014; H01S 3/0071; G01J 1/0411; G01J 1/0414; G01J 1/0448; G01J 1/4257
See application file for complete search history.

(56) References Cited

U.S. PATENT DOCUMENTS 4,249,140 A * 2/1981 Frieberg ................. H01S 3/139
372/66
5,329,350 A 7/1994 Wright et al.
(Continued)

FOREIGN PATENT DOCUMENTS

CN 109798847 A 5/2019
WO WO-9012999 A * 11/1990 ............ G01J 1/4257
(Continued)

OTHER PUBLICATIONS

International Search Report and Written Opinion received for International Patent Application No. PCT/EP2021/080472 mailed on Feb. 18, 2022, 15 pages.

*Primary Examiner* — Xinning (Tom) Niu
(74) *Attorney, Agent, or Firm* — Morrison & Foerster LLP

(57) ABSTRACT

A system for correcting the wavefront of a laser beam includes a beamsplitter for splitting off a fraction of the laser beam to be used as a diagnostic beam, a focusing element for bringing the diagnostic beam to a focus, a measurement subsystem for measuring sizes of the diagnostic beam at upstream and/or downstream locations with respect to a nominal location of the focus, and at least one adaptive optic, located upstream from the beamsplitter, for correcting the wavefront of the laser beam at least partly based on the measured sizes of the diagnostic beam at the upstream and/or downstream locations. The upstream and downstream locations correspond to mid-field locations in the laser beam as imaged by the focusing element. The system takes advantage of the sensitivity of the laser beam size to a waist location shift being greatest at one Rayleigh length from the nominal waist location.

28 Claims, 12 Drawing Sheets

(51) Int. Cl.
*H01S 3/00* (2006.01)
*H01S 3/08* (2023.01)

(56) References Cited

U.S. PATENT DOCUMENTS

| | | | | |
|---|---|---|---|---|
| 9,502,854 B1* | 11/2016 | Filgas | ................... | H01S 3/083 |
| 2005/0254112 A1* | 11/2005 | Webb | ................ | G02B 26/0825 |
| | | | | 359/224.1 |
| 2018/0212393 A1* | 7/2018 | Filgas | .................. | H01S 3/0941 |

FOREIGN PATENT DOCUMENTS

| WO | WO-1990012999 A1 | 11/1990 |
|---|---|---|
| WO | WO-2010039329 A2 | 4/2010 |
| WO | WO-2013179281 A1 | 12/2013 |
| WO | WO-2017091294 A2 | 6/2017 |

* cited by examiner

LASER BEAM WAVEFRONT CORRECTION WITH ADAPTIVE OPTICS AND MID-FIELD MONITORING

TECHNICAL FIELD OF THE INVENTION

The present invention relates in general to laser beam wavefront correction, in particular to techniques for stabilizing size and divergence properties of laser beams using adaptive optics.

DISCUSSION OF BACKGROUND ART

The beam quality of a laser beam characterizes its focusability. The wavefronts of a high-quality laser beam have smooth and simple shapes. A high-quality laser beam can be focused more tightly than a low-quality laser beam. Different measures of beam quality are used in the art. One measure is the beam parameter product (BPP), defined as the product of (i) the beam radius at the beam waist and (ii) the far-field beam divergence angle. The highest possible beam quality is achieved for a diffraction-limited Gaussian beam. Thus, another measure of beam quality is the $M^2$ factor, defined as the ratio of (i) the BPP for the laser beam under consideration to (ii) the BPP of a diffraction-limited Gaussian beam of the same wavelength. Actual measurement of the $M^2$ factor, or, similarly, the BPP, is typically fairly tedious. Such measurement generally involves focusing the laser beam to a waist and measuring the beam size at several locations at and near the waist, i.e., in the near-field, and also at several locations that are at least two Rayleigh lengths away from the waist, i.e., in the far-field. A fitting function is fitted to the beam size measurements, and the $M^2$ factor is derived from the fit parameters.

Some optical elements perform their intended function by changing the wavefront of an incident laser beam. A prime example of this is a lens that works by changing the wavefront curvature of the incident light. Optical elements may, however, also cause undesirable wavefront changes. For example, light-induced heating of the gain crystal in a high-power solid-state laser may lead to thermal lensing. The thermal lensing is caused by the laser radiation non-uniformly heating the gain crystal to produce a temperature-induced gradient in the refractive index of the grain crystal. In another example, generation of ultraviolet (UV) laser light in a nonlinear crystal may, if the UV laser light is sufficiently powerful, degrade the nonlinear crystal. Both thermal lensing and UV-induced degradation, when mild, cause the laser beam wavefront curvature to change as a function of time, which leads to temporal instability in the size and divergence properties of the output laser beam. When more severe, these effects degrade the beam quality and/or power.

An adaptive optic is an optical element that can be adjusted to change the wavefront of a light field (e.g., a laser beam). For example, a deformable mirror may be deformed to impart a desired wavefront change on the reflected light. Similarly, a deformable lens may be deformed to impart a desired wavefront change on the transmitted light. Although open-loop operation is sufficient in some scenarios, an adaptive optic is typically incorporated into an active-feedback loop that repeatedly adjusts the adaptive optic according to measurements of the resulting wavefront.

Both MEMS-based and piezoelectric-based deformable mirrors, designed for laser-beam wavefront correction, are now commercially available. These deformable mirrors have a flexible mirror surface, a support substrate, and an actuator array positioned between the backside of the flexible mirror surface and the support substrate. Each actuator can adjust the local distance between the support substrate and the mirror surface. The actuator array has a high number of actuators, typically tens or more, arranged in a two-dimensional array to offer general-purpose and high-resolution wavefront control.

SUMMARY OF THE INVENTION

Disclosed herein are systems and methods for correcting the wavefront of a laser beam in the presence of one or more sources of undesirable wavefront deformation. We have realized that in certain common types of laser systems, the dominant wavefront deformation problem is a shift in the location and size of a laser beam waist. In addition, we have realized that the highest sensitivity of beam-size measurements to shifts in a waist location are achieved in the mid-field, i.e., at approximately one Rayleigh length from the waist, as opposed to in the near-field or the far-field. Therefore, the present systems and methods take the unconventional approach of monitoring beam sizes in the mid-field, relative to a waist, and use mid-field measurements to correct for wavefront deformation. In contrast to the many locations required for conventional measurements of the $M^2$ factor, the present approach to wavefront correction requires measurements at one location only, although two locations are preferable for precision and some embodiments further implement a far-field measurement to achieve additional functionality.

The present mid-field monitoring technique is generally applicable to wavefront monitoring and correction in situations where the primary issue is a shift in a laser beam waist location. We have found the mid-field monitoring technique particularly useful for actively stabilizing the waist location of ultraviolet (UV) laser beams generated in nonlinear crystals subject to UV degradation over time. As is the case for many laser system applications, such UV laser systems are often required to maintain stable beam parameters for operation times as long as thousands of hours, and the present wavefront correction technique may be implemented to at least help meet this requirement.

We have further found that the wavefront correction, required to stabilize the waist location based on mid-field monitoring, may be performed with relatively simple adaptive optics, for example one or more deformable cylindrical mirrors each having as little as three actuators. This represents a significant reduction in cost and complexity, as compared to systems relying on the deformable mirrors commercially available today.

In one aspect, a system for correcting the wavefront of a laser beam includes a primary beamsplitter for splitting off a fraction of the laser beam to be used as a diagnostic beam. The laser beam has a waist at a nominal waist location. The system further includes a focusing element for bringing the diagnostic beam to a focus, and a measurement subsystem configured to measure a size of the diagnostic beam at at-least one of an upstream and a downstream location with respect to a nominal location of the focus of the diagnostic beam. Each of the upstream and downstream locations of the diagnostic beam corresponds to an image of a respective mid-field location of the laser beam. Additionally, the system includes at least one adaptive optic, located in the laser beam upstream from the primary beamsplitter, for correcting the wavefront of the laser beam at least partly based on the measured sizes of the diagnostic beam for at least one of the upstream and downstream locations.

In another aspect, a method for correcting wavefront of a laser beam includes a step of splitting off a fraction of the laser beam as a diagnostic beam. The laser beam has a waist at a nominal waist location. The method further includes steps of bringing the diagnostic beam to a focus, and measuring a size of the diagnostic beam at at-least one of an upstream and a downstream location with respect to a nominal location of the focus of the diagnostic beam. Each of the upstream and downstream locations of the diagnostic beam corresponds to an image of a respective mid-field location of the laser beam. The method also includes a step of correcting, at least partly based on the sizes measured for at least one of the upstream and downstream locations, the wavefront of the laser beam with at least one adaptive optic located in the laser beam upstream of the split between the laser beam and the diagnostic beam.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION OF THE INVENTION

Figure 1:
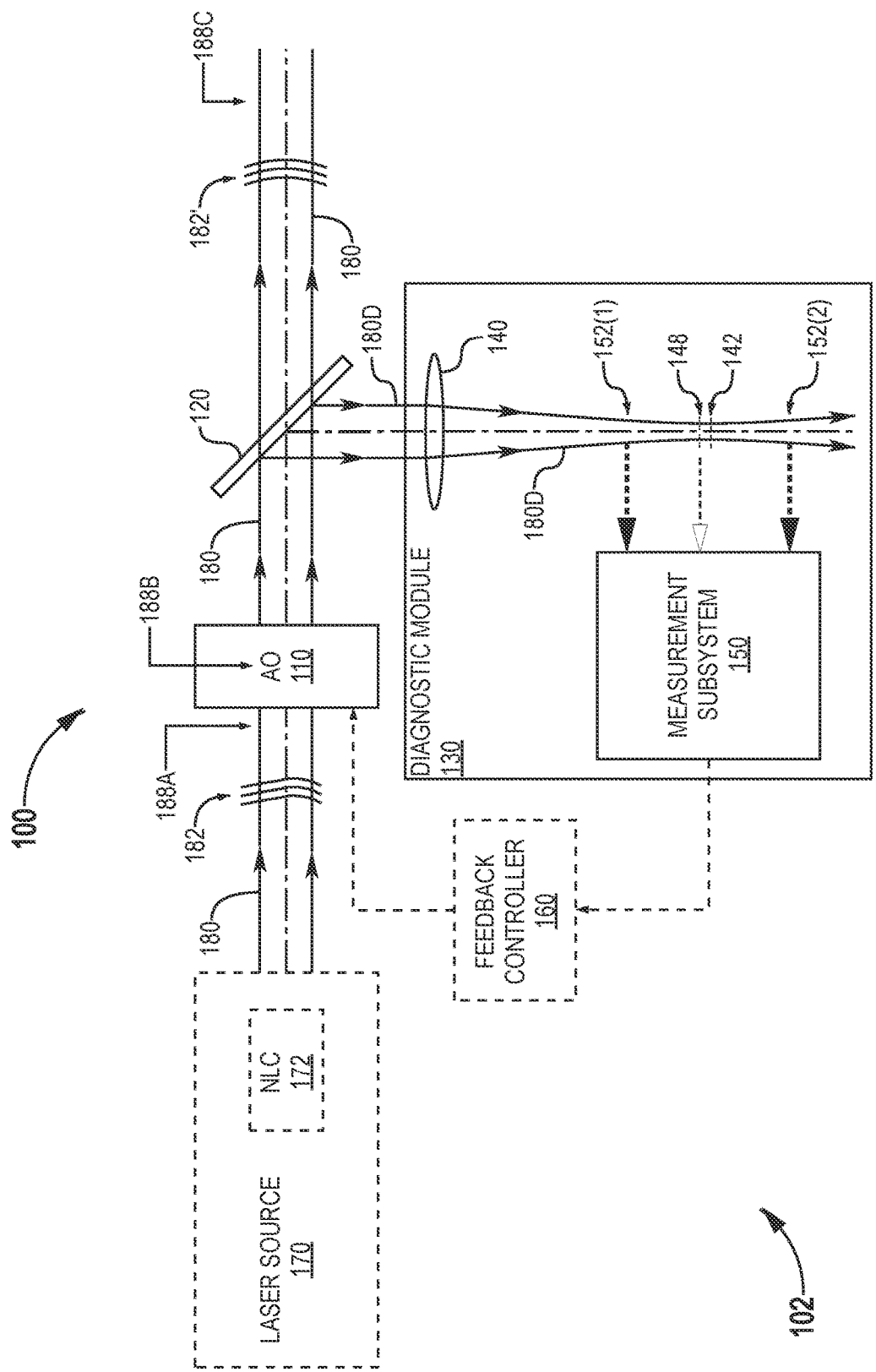
FIG. 1 illustrates a system for correcting the wavefront of a laser beam, according to an embodiment. The system utilizes beam size measurement in the mid-field, and adaptive optics.

Referring now to the drawings, wherein like components are designated by like numerals, FIG. 1 illustrates one system 100 for correcting the wavefront 182 of a laser beam 180. System 100 system utilizes beam size measurement in the mid-field of laser beam 180. FIG. 1 shows system 100 in an example scenario where system 100 is incorporated into a laser apparatus 102.

Laser apparatus 102 includes system 100, and a laser source 170 that generates laser beam 180. Laser source 170 may include one or more elements that cause deformation of wavefront 182. Herein, wavefront deformation refers to an unwanted wavefront change as opposed to, e.g., the intended wavefront change imparted by a lens. For example, laser source 170 may include a nonlinear crystal (NLC) 172 that generates laser beam 180 through frequency conversion but, undesirably, also deforms wavefront 182. In one implementation, laser beam 180 is a high-power ultraviolet (UV) laser beam that causes nonlinear crystal 172 to gradually undergo UV degradation. The UV degradation deforms wavefront 182, and system 100 corrects for this wavefront deformation to maintain stable beam parameters for laser beam 180.

System 100 includes one or more adaptive optics (AO) 110, a beamsplitter 120, and a diagnostic module 130. Beamsplitter 120 splits off a fraction of laser beam 180 to be used as a diagnostic beam 180D. The one or more adaptive optics 110 are located upstream of beamsplitter 120 and correct wavefront 182 according to measurements obtained from diagnostic module 130. In one embodiment, each adaptive optic 110 is an adaptive mirror, for example a deformable mirror including a flexible mirror surface, a support substrate, and a plurality of actuators therebetween. Alternatively, system 100 may implement at least one adaptive optics 110 as an adaptive lens. In certain embodiments of system 100, adaptive mirrors may provide a simpler and cheaper solution than adaptive lenses.

The caustic of laser beam 180, passing through beamsplitter 120, is characterized by a waist 188 and a Rayleigh range. Waist 188 may be upstream or downstream from beamsplitter 120, for example at one of the locations indicated by arrows 188A, 188B, and 188C. Waist 188 may be actual or virtual. Deformation of wavefront 182 may be associated with a deviation of the far-field divergence of laser beam 180 from its nominal far-field divergence. This deviation shifts waist 188 of laser beam 180 away from its nominal waist location.

Figure 2A:
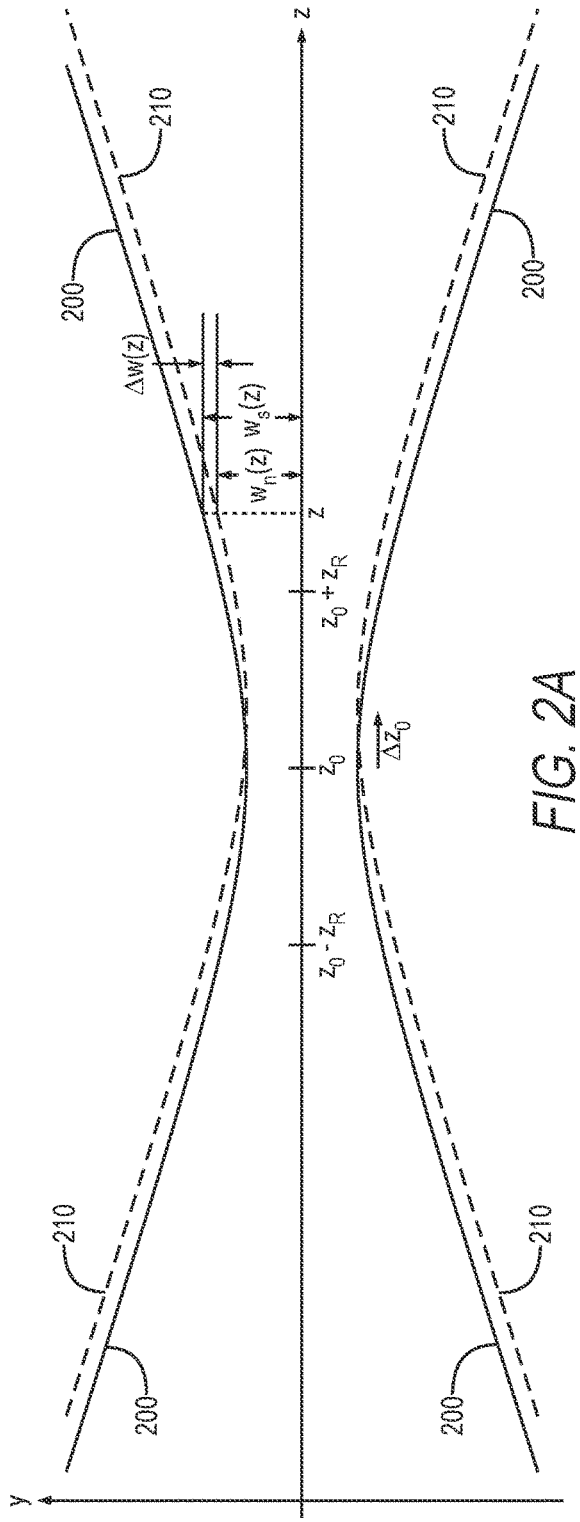
FIGS. 2A and 2B illustrate sensitivity of beam size to a shift in waist location, as a function of distance from a nominal waist location, and demonstrate that the maximum sensitivity is achieved when the beam sizes are measured at one Rayleigh length from the nominal focus.
Figure 2B:
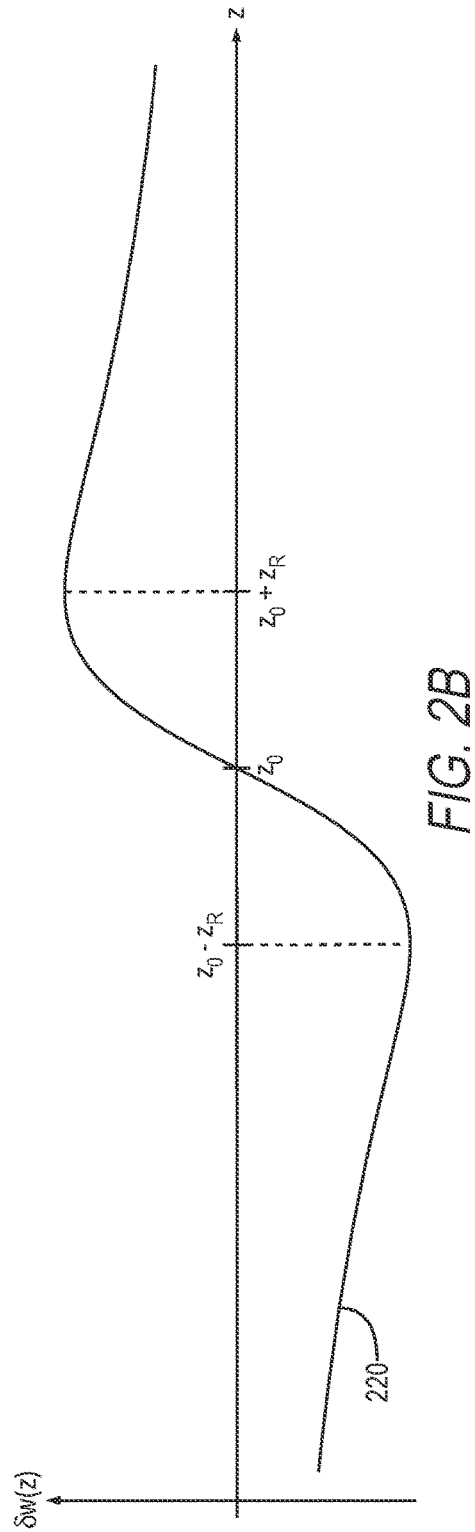

FIGS. 2A and 2B illustrate sensitivity of beam size to a shift in waist location, as a function of distance from a nominal waist location. FIGS. 2A and 2B demonstrate that the maximum sensitivity is achieved when the beam sizes are measured at one Rayleigh length $z_R$ from the nominal waist.

FIG. 2A plots the caustic of a Gaussian beam 200 as a function of longitudinal coordinate z. FIG. 2A considers one transverse axis, here the y-axis, of Gaussian beam 200.

Gaussian beam 200 has a waist at a location $z_0$. FIG. 2A also plots the caustic of a Gaussian beam 210. Gaussian beam 210 is identical to Gaussian beam 200 apart from being shifted in the positive z-axis direction by an amount $\Delta z_0$. At any given location z, Gaussian beam 200 has as radius $w_n(z)$, and Gaussian beam 210 has a radius $w_s(z)$. The difference $\Delta w(z)$ between $w_n(z)$ and $w_s(z)$ increases with distance away from the region of the waists of Gaussian beams 200 and 210. However, the beam radii $w_n(z)$ and $w_s(z)$ also increase with distance away from the waist region. In the far field, both beam radii increase linearly with distance. As a result, the relative difference $\Delta w(z)/w(z)$ is a nontrivial function of z.

FIG. 2B explores the relationship $\Delta w(z)/w(z)$ mathematically and plots a normalized beam size change $\delta w(z)$ as a function of z, wherein $$\delta w(z) = \frac{\frac{d}{dz}w(z)}{(z)}.$$

It is evident that the absolute value of $\delta w(z)$ peaks at the locations $z_0 - z_R$ and $z_0 + z_R$. FIG. 2B thereby demonstrates that, for a Gaussian beam, the maximum sensitivity of the beam size to a shift in waist location is attained at one Rayleigh length $z_R$ from the nominal focus, at least as long as the shift in waist location is small compared to the Rayleigh length. When inserting the Gaussian beam caustic $$w(z) = w_0 \sqrt{1 + \left(\frac{Z}{Z_R}\right)^2}$$

into the above expression for $\delta w(z)$, one finds that $\delta w(z)$ takes on the positive value $0.5/z_R$ at location $z_0 + z_R$ and that $\delta w(z)$ takes on the negative value $-0.5/z_R$ at location $z_0 - z_R$. Accordingly, if the Gaussian beam shifts in the positive z-axis direction, $\delta w(z)$ is positive at location $z_0 + z_R$ and negative at location $z_0 - z_R$, whereas, if the Gaussian beam shifts in the negative z-axis direction, $\delta w(z)$ is negative at location $z_0 + z_R$ and positive at location $z_0 - z_R$. Additionally, FIG. 2B shows that $\delta w(z)$ is nearly constant within a $\pm 0.1 z_R$ range of each of the locations $z_0 - z_R$ and $z_0 + z_R$, and decreases only slightly within a $\pm 0.2 z_R$ range of each of the locations $z_0 - z_R$ and $z_0 + z_R$. Accordingly, herein, a mid-field location refers to a location, along the longitudinal axis of a laser beam, that is at least approximately one Rayleigh length $z_R$ from a nominal waist location, for example between $0.9 z_R$ and $1.1 z_R$ from the nominal waist location or between $0.8 z_R$ and $1.2 z_R$ from the nominal waist location.

Referring again to FIG. 1, it may be impractical to measure the size of laser beam 182 a Rayleigh length away from waist 188. Even if waist 188 is in an accessible location, the Rayleigh length may be impractically long. For example, a well-collimated laser beam 180 may have a Rayleigh length of ten meters or more. Diagnostic module 130 serves to image the Rayleigh range of laser beam 180 to an accessible nearby location.

Diagnostic module 130 includes a focusing element 140, e.g., a lens, and a measurement subsystem 150. Focusing element 140 brings diagnostic beam 180D to a focus. Measurement subsystem 150 measures a size of diagnostic beam 180D at at-least one of an upstream location 152(1) and a downstream location 152(2) relative to a nominal location 142 of the focus of diagnostic beam 180D. Nominal focus location 142 is the location of the waist of diagnostic beam 180D, as generated by focusing element 140, in the absence of deformation of wavefront 182. Upstream location 152(1) is selected to be where focusing element 140 causes diagnostic beam 180D to form an image of a nominal mid-field location of laser beam 180 downstream of waist 188. Downstream location 152(2) is selected to be where focusing element 140 causes diagnostic beam 180D to form an image of a nominal mid-field location of laser beam 180 upstream of waist 188. These choices of upstream and downstream locations 152(1) and 152(2) optimize the sensitivity of measurement subsystem 150 to shifts in waist 188 of laser beam 180.

Beam size determination by measurement subsystem 150 may utilize a variety of beam size measures, as known in the art. For example, a beam size may be determined as the $1/e^2$ radius or diameter, the full-width at half-maximum or the half-width at half maximum, or as the second-order moment of the power density distribution. The second-order moment has the advantage of being unambiguously defined regardless of the profile of the power density distribution.

In operation of system 100, the one or more adaptive optics 110 correct wavefront 182, at least partly based on the measured sizes of diagnostic beam 180D at locations 152 (1,2), to achieve a corrected wavefront 182' of laser beam 180 downstream of adaptive optic(s) 110. For this purpose, system 100 may include a feedback controller 160 that actively adjusts adaptive optic(s) 110 according to measurements made by measurement subsystem 150. Feedback controller 160 may be operated essentially continuously according to continuous or frequently repeated measurements by measurement subsystem 150.

Since, as discussed above in reference to FIGS. 2A and 2B, the achievement of maximum sensitivity at one Rayleigh length from the nominal focus relies on shifts in the location of waist 188 being small compared to the Rayleigh length, it may be advantageous to actively adjust adaptive optic(s) 110 on a near-continuous basis to keep any deviations between the actual and the nominal location of waist 188 small relative to the Rayleigh length. System 100 is well-suited for maintaining the nominal location of waist 188 with high accuracy.

In embodiments where measurement subsystem 150 measures beam sizes only at one of upstream location 152(1) and downstream location 152(2), the correction performed by adaptive optic(s) 110 serves to maintain an absolute target value of the measured beam size at the selected one of upstream location 152(1) and downstream location 152(2). Improved accuracy and robustness may be achieved in embodiments where measurement subsystem 150 measures beam sizes at both of upstream location 152(1) and downstream location 152(2). Here, the correction performed by adaptive optic(s) 110 may be configured to maintain an absolute target value of the measured beam size at each of upstream location 152(1) and downstream location 152(2). Alternatively, measurement subsystem 150 may monitor a ratio between corresponding beam sizes at upstream location 152(1) and downstream location 152(2), with the correction performed by adaptive optic(s) 110 configured to maintain a target value of the ratio.

In one class of embodiments, measurement subsystem 150 is configured to exclusively measure beam sizes at one or both of locations 152(1,2). In another class of embodiments, measurement subsystem 150 also measures the beam size at the focal plane 148 of focusing element 140, and the one or more adaptive optics 110 may further base their correction of wavefront 182 on the measured beam size at focal plane 148. (Such embodiments are discussed in more detail below in reference to FIGS. 10 and 12.) Each of these classes of embodiments may be implemented in a one-dimensional (1D) arrangement or a two-dimensional (2D) arrangement. In the 1D arrangement, measurement subsystem 150 obtains measurements in a single axis transverse to the propagation direction of diagnostic beam 180D, and the one or more adaptive optics 110 correct wavefront 182 in a corresponding transverse axis with respect to laser beam 180. In the 2D arrangement, measurement subsystem 150 obtains measurements in two axes that are transverse to the propagation direction of diagnostic beam 180D, and the one or more adaptive optics 110 correct wavefront 182 in two transverse axes with respect to laser beam 180.

In certain applications of system 100, the wavefront deformation properties are different in the two transverse axes of laser beam 180. For example, when nonlinear crystal 172 is birefringent, beam parameters of laser beam 180 are likely to exhibit one behavior in the axis parallel to the walk-off direction and another behavior in the axis perpendicular to the walk-off direction. In such applications, system 100 may advantageously implement each adaptive optic 110 as a cylindrical mirror. Thus, the 1D arrangement of system 100, discussed above, may implement one, two, or more adaptive cylindrical mirrors. Similarly, the 2D arrangement of system 100, discussed above, may implement two mirror sets respectively arranged to correct wavefront 182 in two respective mutually orthogonal transverse axes. Each mirror set may consist of a single adaptive cylindrical mirror or several adaptive cylindrical mirrors.

Measurement subsystem 150 may use beam size measurement techniques known in the art, optionally in conjunction with higher-order wavefront measurement techniques known in the art. In one example, measurement subsystem 150 includes a conventional beam profiler, such as a scanning-slit beam profiler, a charge-coupled-device (CCD) camera beam profiler, or, for laser beams 180 in the infrared spectrum, a pyrometer-based beam profiler. This example of measurement subsystem 150 may further include a conventional wavefront sensor, such as a Shack-Hartmann wavefront sensor.

Without departing from the scope hereof, diagnostic module 130 may be provided as a standalone diagnostic module. Diagnostic module 130 may be implemented in a third-party laser system and used for non-corrective monitoring of beam parameters, or to assist in wavefront correction with third-party adaptive optics or other methods of wavefront correction.

Figure 3:
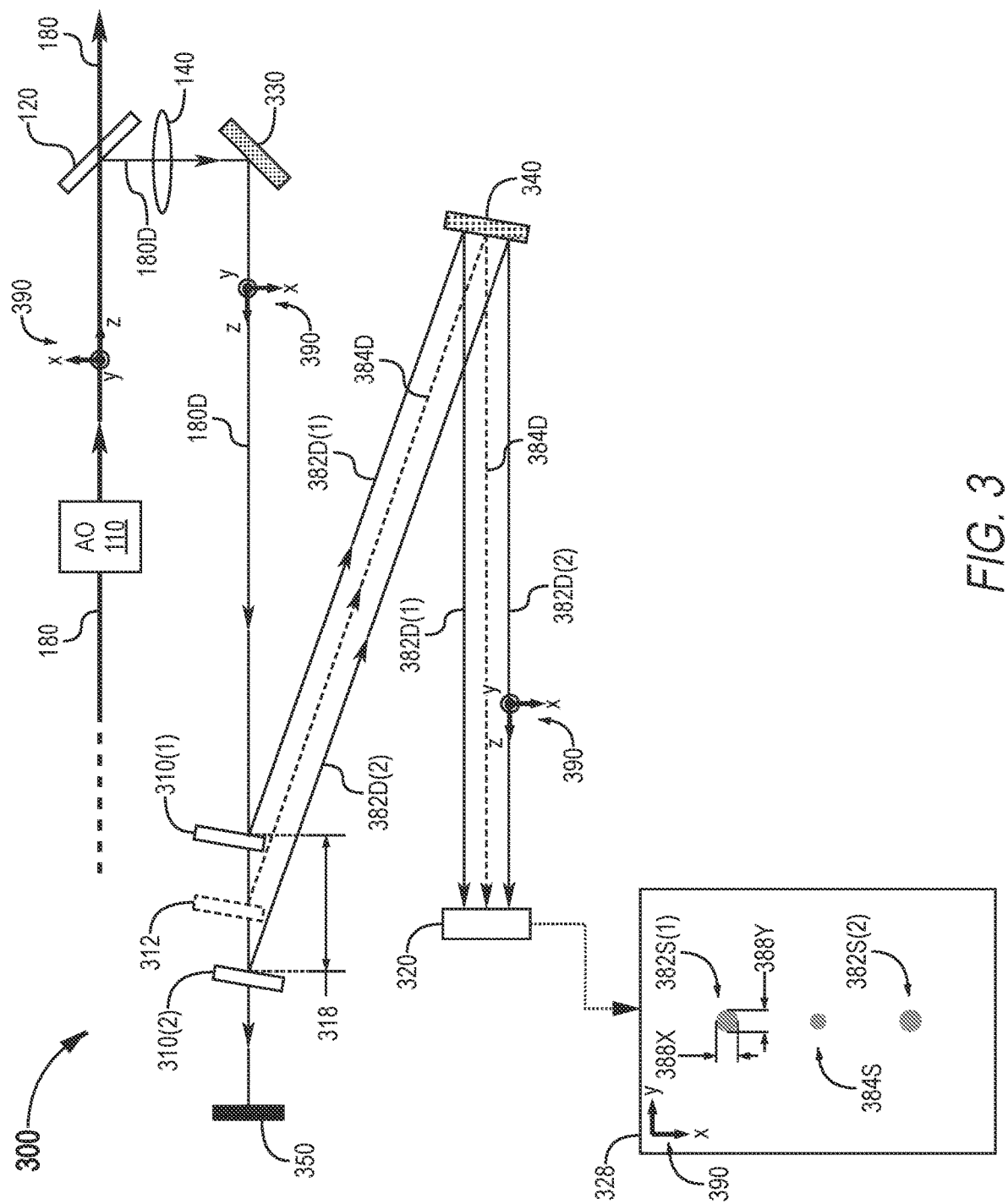
FIG. 3 illustrates a measurement subsystem that uses a single stationary image sensor to simultaneously measure beam sizes at both upstream and downstream locations, and optionally also at the focus, according to an embodiment.

FIG. 3 illustrates one measurement subsystem 300 that uses a single stationary image sensor 320 to simultaneously measure beam sizes at both upstream location 152(1) and downstream location 152(2), and optionally also at focal plane 148. Measurement subsystem 300 is an embodiment of measurement subsystem 150.

Measurement subsystem 300 includes two beamsplitters 310(1) and 310(2) arranged in series along the propagation path of diagnostic beam 180D, a distance 318 apart from each other. Beamsplitters 310(1) and 310(2) split off respective fractions 382D(1) and 382D(2) of diagnostic beam 180D. Image sensor 320 intercepts both diagnostic beam fractions 382D(1) and 382D(2). However, the different path lengths of diagnostic beam fractions 382D(1) and 382D(2), between focusing element 140 and image sensor 320, cause image sensor 320 to intercept diagnostic beam fractions 382D(1) and 382D(2) at different longitudinal distances from the nominal focus location 142. Distance 318 and the propagation paths of diagnostic beam fractions 382D(1) and 382D(2) are configured such that image sensor 320 intercepts diagnostic beam fractions 382D(1) and 382D(2) at upstream location 152(1) and downstream location 152(2), respectively. As a result each image 328 captured by image sensor 320 includes (a) a spot 382S(1) indicating the transverse profile of diagnostic beam 180D at upstream location 152(1), and (b) a spot 382S(2) indicating the transverse profile of diagnostic beam 180D at downstream location 152(2).

In the example depicted in FIG. 3, measurement subsystem 300 includes two folding mirrors 330 and 340 to achieve a desired form factor. Without departing from the scope hereof, one or both of folding mirrors 330 and 340 may be omitted or arranged differently, and/or measurement subsystem 300 may include additional folding mirrors. The depicted example of measurement subsystem 300 also includes a beam block 350. Beam block 350 could, advantageously, be in the form of a diagnostic power meter.

FIG. 3 shows a cartesian coordinate system 390 indicating the longitudinal axis (z-axis) and transverse axes (x-axis and y-axis) of laser beam 180. As diagnostic beam 180D is split off from laser beam 180, and diagnostic beam fractions 382D(1) and 382D(2) are split off from diagnostic beam 180D, coordinate system 390 is passed on to diagnostic beam fractions 382D(1) and 382D(2). The orientation of coordinate system 390 changes as the associated beams change direction. Ultimately, at image sensor 320, coordinate system 390 may have a different orientation than at laser beam 180 upstream from beamsplitter 120. Regardless, image 328 shows spots 382S(1,2) in the transverse xy-plane of coordinate system 390 with respect to laser beam 180. For each spot 328(1,2), a transverse dimension 388X corresponds to the x-axis with respect to laser beam 180, and a transverse dimension 388Y corresponds to the y-axis with respect to laser beam 180.

Embodiments of system 100 implementing measurement subsystem 300 may thus operate adaptive optic(s) 110 to (a) correct wavefront 182 in the x-axis according to transverse dimensions 388X of spots 382(1) and 382(2) and (b) correct wavefront 182 in the y-axis according to transverse dimensions 388Y of spots 382(1) and 382(2).

In certain embodiments, measurement subsystem 300 includes an additional beamsplitter 312 located between beamsplitters 310(1) and 310(2). Beamsplitter 312 splits off a fraction 384D of diagnostic beam 180D. Diagnostic beam fraction 384D propagates to image sensor 320 with a path length that causes image sensor 320 to intercept diagnostic beam fraction 384D at focal plane 148 of focusing element 140 (see FIG. 1). Thus, the corresponding spot 384S in image 328 enables beam size measurements at focal plane 148. Spot 384S may also provide other information such as higher-order transverse mode properties of diagnostic beam 180D and thus of laser beam 180. Herein, higher-order transverse mode properties refer to properties of higher order than a beam size or divergence. In an alternative embodiment, not depicted in FIG. 3, a fraction of diagnostic beam 180D is directed to a conventional wavefront sensor, such as a Shack-Hartmann sensor for evaluation of higher-order transverse mode properties.

Although FIG. 3 depicts the diagnostic beam fractions as propagating alongside each other, the different diagnostic beam fractions may instead take different respective paths, e.g., nonparallel paths, to image sensor 320, as long as the path lengths are such that image sensor 320 intercepts diagnostic beam fractions 382D(1) and 382D(2) at locations 152(1) and 152(2), respectively (and, in embodiments including beamsplitter 312, image sensor 320 intercepts diagnostic beam fraction 384D at focal plane 148).

Without departing from the scope hereof, measurement subsystem 300 may be modified or operated to measure beam sizes at focal plane 148 and only one of upstream location 152(1) and downstream location 152(2).

Figure 4:
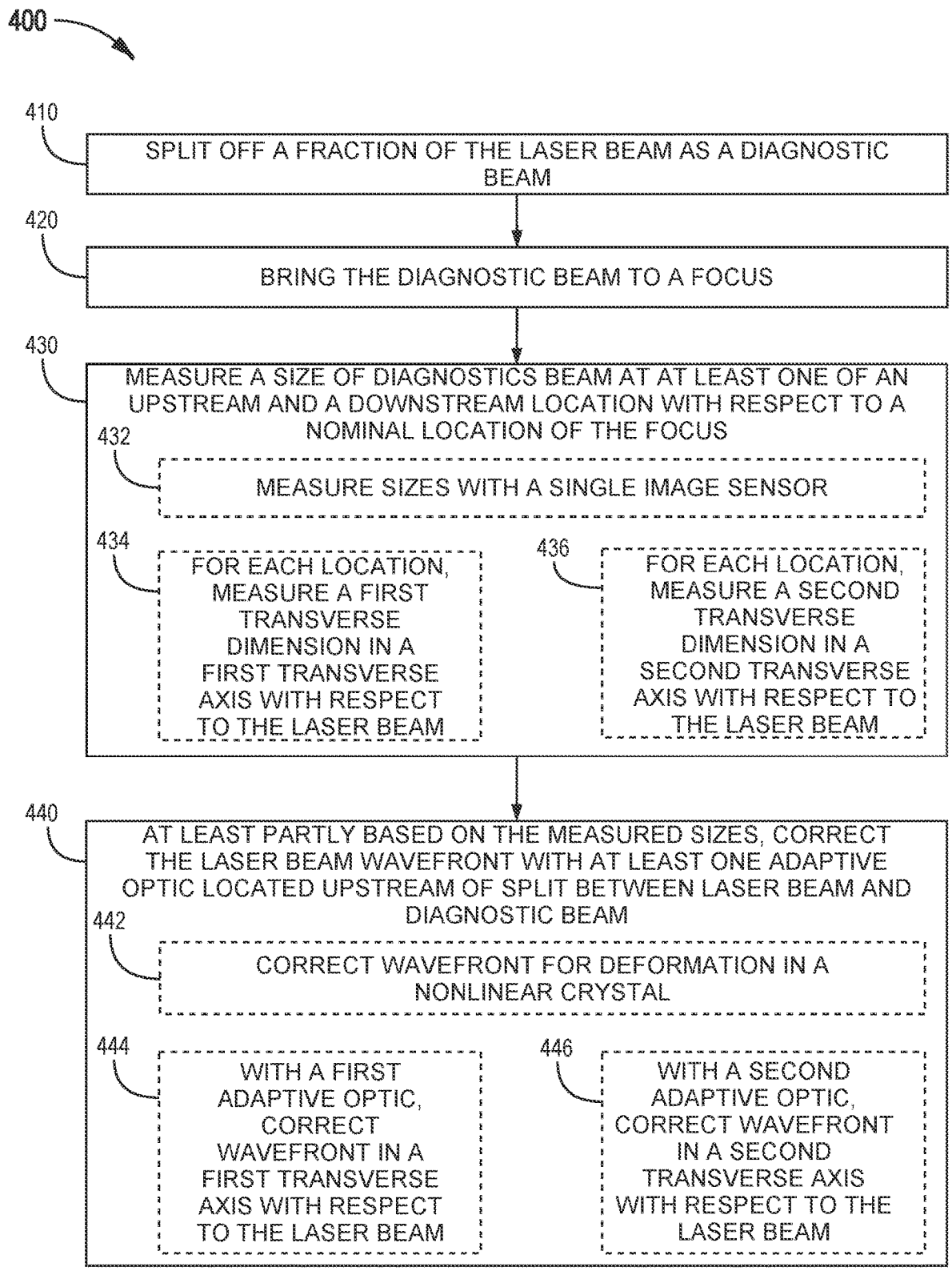
FIG. 4 is a flowchart of a method for correcting the wavefront of a laser beam, according to an embodiment. The method utilizes beam size measurement in the mid-field, and adaptive optics.

FIG. 4 is a flowchart of one method 400 for correcting the wavefront of a laser beam. Method 400 may be performed by system 100. Method 400 includes steps 410, 420, 430, and 440.

Step 410 splits off a fraction of the laser beam as a diagnostic beam. In one example of step 410, beamsplitter 120 splits off diagnostic beam 180D from laser beam 180, as discussed above in reference to FIG. 1.

Step 420 brings the diagnostic beam to a focus. The focus is at a nominal focus location when the laser beam wavefront is in a nominal state. When the laser beam wavefront is deformed, the focus location may be displaced from the nominal focus location. In one example of step 420, focusing element 140 focuses diagnostic beam 180D, as discussed above in reference to FIG. 1.

Step 430 measures a size of the diagnostic beam at at-least one of an upstream and a downstream location, with respect to the nominal focus location. The upstream location corresponds to a downstream mid-field location of the laser beam as imaged, through the diagnostic beam, by step 420, and the downstream location corresponds to an upstream mid-field location of the laser beam as imaged, through the diagnostic beam, by step 420. In one example of step 430, measurement subsystem 150 measures a size of diagnostic beam 180D at one or both of locations 152(1) and 152(2), as discussed above in reference to FIG. 1. In an embodiment, step 430 includes a step 432 of measuring the sizes with a single image sensor. In one example of this embodiment, step 432 utilizes measurement subsystem 300 to measure the sizes with image sensor 320.

Step 440 corrects the laser beam wavefront with at least one adaptive optic that is located upstream of the location where the diagnostic beam is split off in step 410. The correction performed by the adaptive optic(s) is at least partly based on the sizes measured in step 430. In one example of step 440, one or more adaptive optics 110 correct wavefront 182 of laser beam 180, at least partly based on beam sizes measured by measurement subsystem 150, as discussed above in reference to FIG. 1. Step 440 may utilize a feedback controller, such as feedback controller 160, to control the adaptive optic(s) according to measurements made in step 430.

In one embodiment, method 400 is used to correct for wavefront deformation caused by a nonlinear crystal. In this embodiment, step 440 includes a step 442 of correcting the wavefront for such deformation. In one example of step 442, one or more adaptive optics 110 correct wavefront 182 of laser beam 180 for deformation caused by nonlinear crystal 172. This embodiment of method 400 may stabilize the wavefront of the laser beam, for example as schematically indicated by wavefront 182' in FIG. 1, in the presence of changing wavefront deformation behavior in the nonlinear crystal over time. In one scenario, wavefront correction by the adaptive optic(s) is sufficient to meet a set of performance requirements. In another scenario, degradation of the nonlinear crystal is sufficiently severe that wavefront correction by the adaptive optic(s) is sufficient only for a limited period of time, whereafter the position of the nonlinear crystal is shifted such that the laser beam passes through a non-degraded portion of the nonlinear crystal. When the nonlinear crystal is shifted, the wavefront is likely to make a discrete change. In one embodiment, step 440 is further configured to maintain or re-establish wavefront properties of the laser beam when the nonlinear crystal is shifted.

In certain embodiments, steps 430 and 440 include respective steps 434 and 444. For each of the upstream and downstream locations, step 434 measures a first transverse dimension of the diagnostic beam in a first transverse axis with respect to the laser beam. Step 444 then uses a first adaptive optic, or a first set of adaptive optics, to correct the wavefront in the first transverse axis. In one example of such embodiments, measurement subsystem 300 measures transverse dimensions 388X of each of spots 382S(1) and 382S(2), and one or more adaptive optics 110 (e.g., one or more adaptive cylindrical mirrors) then correct the wavefront of laser beam 180 in the x-axis. Without departing from the scope hereof, this example may utilize another type of measurement subsystem, for example based on a Shack-Hartmann wavefront sensor, to measure transverse dimensions 388X.

In one embodiment, method 400 is configured for 1D wavefront correction. In this embodiment, steps 430 and 440 operate on the first axis only. In another embodiment, method 400 is configured for 2D wavefront correction with separate correction in each of two mutually orthogonal transverse axes. In this embodiment, step 430 includes step 434 as well as a step 436, and step 440 includes step 444 as well as a step 446. Steps 436 and 446 are similar to steps 434 and 444 except for being applied to an orthogonal axis. In an example, steps 434 and 444 operate on the x-axis of coordinate system 390, while steps 436 and 446 operate on the y-axis.

Figure 5:
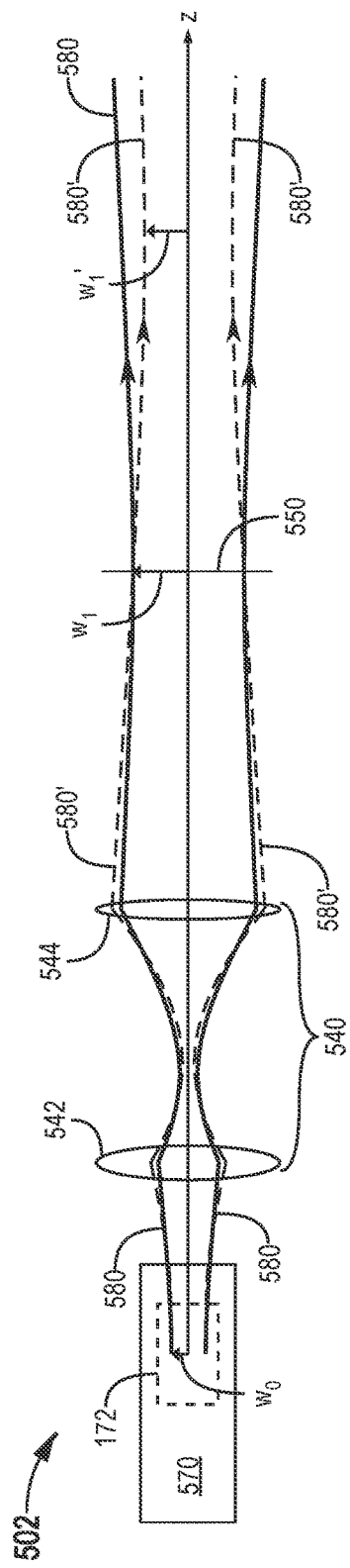
FIG. 5 illustrates a laser apparatus that incorporates a telescope.

FIG. 5 illustrates one laser apparatus 502 that incorporates a telescope. Laser apparatus 502 includes laser source 570 and a telescope 540. Laser source 570 is an embodiment of laser source 170 that generates a laser beam 580 such that laser beam 580 has a waist $w_0$ internally in laser source 570. In one embodiment, laser source 570 includes nonlinear crystal 172, and waist $w_0$ is inside nonlinear crystal 172. Telescope 540 images waist $w_0$ onto an image plane 550. Telescope 540 may consist of two lenses 542 and 544. Laser source 570 includes a source of wavefront deformation. For example, a gradual change in the refractive index of nonlinear crystal 172 may gradually deform the wavefront of laser beam 580. Laser source 570 is configured such that the wavefront deformation does not significantly change the size of laser beam 580 at the nominal location of waist $w_0$, but the wavefront deformation may shift the location and size of the second waist $w_1$ as indicated by waist $w'_1$ of a wavefront-deformed laser beam 580'. Even in the presence of such wavefront deformation, telescope 550 ensures that the size of laser beam 580 remains the same at image plane 550.

Figure 6:
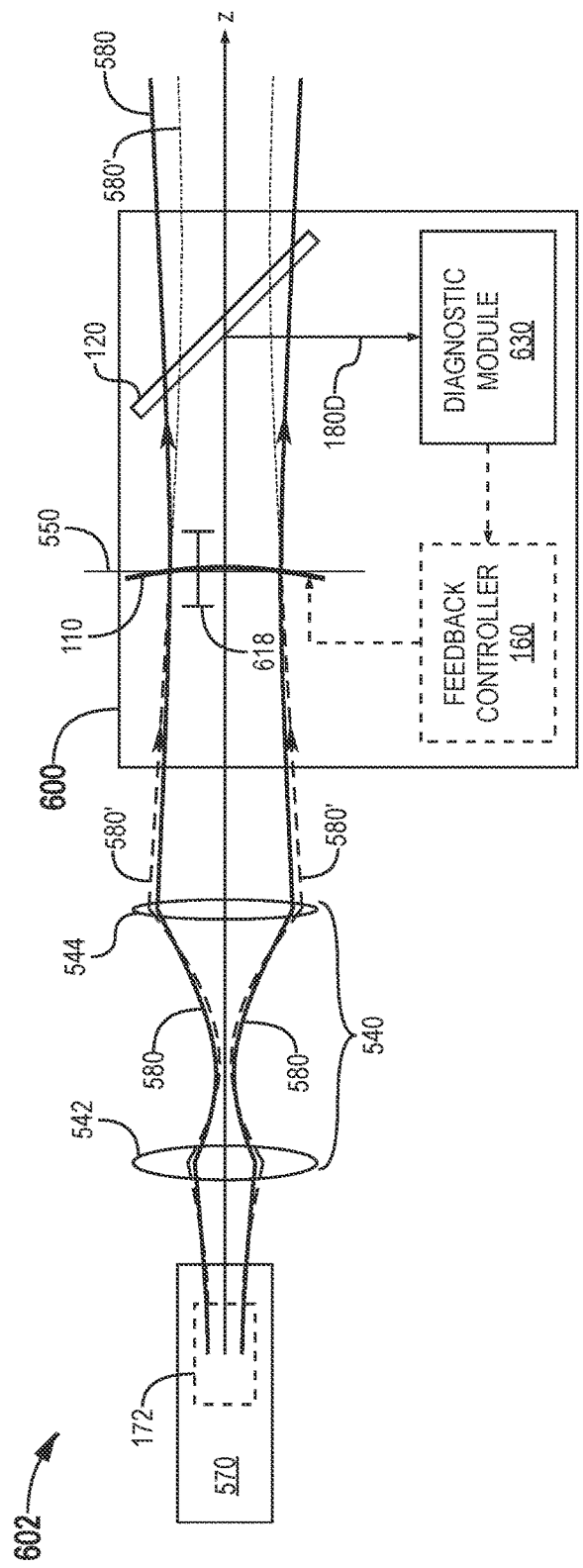
FIG. 6 illustrates a laser apparatus that uses mid-field beam size measurements to stabilize a laser beam waist to an image plane of a telescope, according to an embodiment.

FIG. 6 illustrates one laser apparatus 602 that uses mid-field beam size measurements to stabilize a laser beam waist to an image plane of a telescope. Laser apparatus 602 is an extension of laser apparatus 502 that incorporates a system 600 for wavefront correction to stabilize the waist location of laser beam 580 to image plane 550. System 600 is an embodiment of system 100. FIG. 6 shows laser apparatus 602 in a state where laser source 570 generates wavefront-deformed laser beam 580'.

In laser apparatus 602, beamsplitter 120 is downstream of image plane 550, and one or more adaptive optics 110 are at image plane 550, or at least within a range 618 thereof. Range 618 may span from $0.1z_R$ or $0.2z_R$ upstream of image plane 550 to $0.1z_R$ or $0.2z_R$ downstream of image plane 550, wherein $z_R$ is the Rayleigh length of laser beam 580, with respect to waist $w_1$. These spans of range 618 allow adaptive optic(s) 110 to collimate laser beam 580 while also keeping the size of waist $w_1$ close to its nominal value. The one or more adaptive optics 110 correct the wavefront of laser beam 580 such that, even when laser beam 580 is deformed (for example as indicated by wavefront-deformed laser beam 580' in FIG. 6 propagating to image plane 550), the one or more adaptive optics 110 ensure that the nominal divergence properties of laser beam 580 are maintained downstream of image plane 550, thereby stabilizing waist $w_1$ to image plane 550.

Stabilization of waist $w_1$ to image plane 550 may be done based exclusively on mid-field measurement of beam sizes. Thus, system 600 is an embodiment of system 100 that adjusts adaptive optic(s) 110 based exclusively on mid-field measurement of beam sizes. System 600 includes a diagnostic module 630, an embodiment of diagnostic module 130. Diagnostic module 630 may be configured to measure beam sizes only at upstream location 152(1) and/or downstream location 152(2). System 600 may stabilize waist $w_1$ to image plane 550 by stabilizing one or more beam sizes measured at upstream location 152(1) and/or one or more corresponding beam sizes measured at downstream location 152(2) to their nominal values corresponding to waist $w_1$ being at image plane 550. In one implementation, system 600 includes feedback controller 160, and feedback controller 160 actively adjusts adaptive optic(s) 110 to stabilize transverse beam dimensions, measured at locations 152(1) and 152(2), to their nominal values.

In one implementation, beam sizes are monitored in terms of absolute values, as discussed above in reference to FIG. 1. In another implementation, the values of the beam sizes are monitored in terms of upstream-to-downstream beam size ratios. In this implementation, measurement subsystem 150 of diagnostic module 630 monitors the ratio(s) between (a) one or more beam sizes at upstream location 152(1) and (b) the corresponding beam sizes at downstream location 152(2), and keeps each such ratio at a nominal value. If the location of waist $w_1$ shifts out of image plane 550, the location of the focus of diagnostic beam 180D shifts away from nominal focus location 142, and the ratio between corresponding beam sizes at upstream location 152(1) and downstream location 152(2) changes away from its nominal value. While the beam size of laser beam 580 is the same at $\pm z_R$ from waist $w_1$, the beam sizes of diagnostic beam 180D at the corresponding upstream and downstream locations 152(1) and 152(2) are typically not identical since the $\pm z_R$ locations in laser beam 580 are at different path lengths from focusing element 140. Therefore, the nominal ratio between corresponding beam sizes at upstream location 152(1) and downstream location 152(2) is typically not unity.

System 600 may be configured for 1D or 2D wavefront correction. When configured for 1D wavefront correction, adaptive optic(s) 110, and optionally measurement subsystem 150 of diagnostic module 630, may operate only on a single transverse axis (e.g., the x-axis). When system 600 is configured for 2D wavefront correction, measurement module 150 and adaptive optic(s) 110 operate on two transverse axes. For simplicity of operation, these two transverse axes are preferably mutually orthogonal (e.g., the x- and y-axes). System 600 may be provided as a standalone wavefront correction system configured for incorporation into a third-party laser apparatus that includes laser source 570 and telescope 540.

Figure 7:
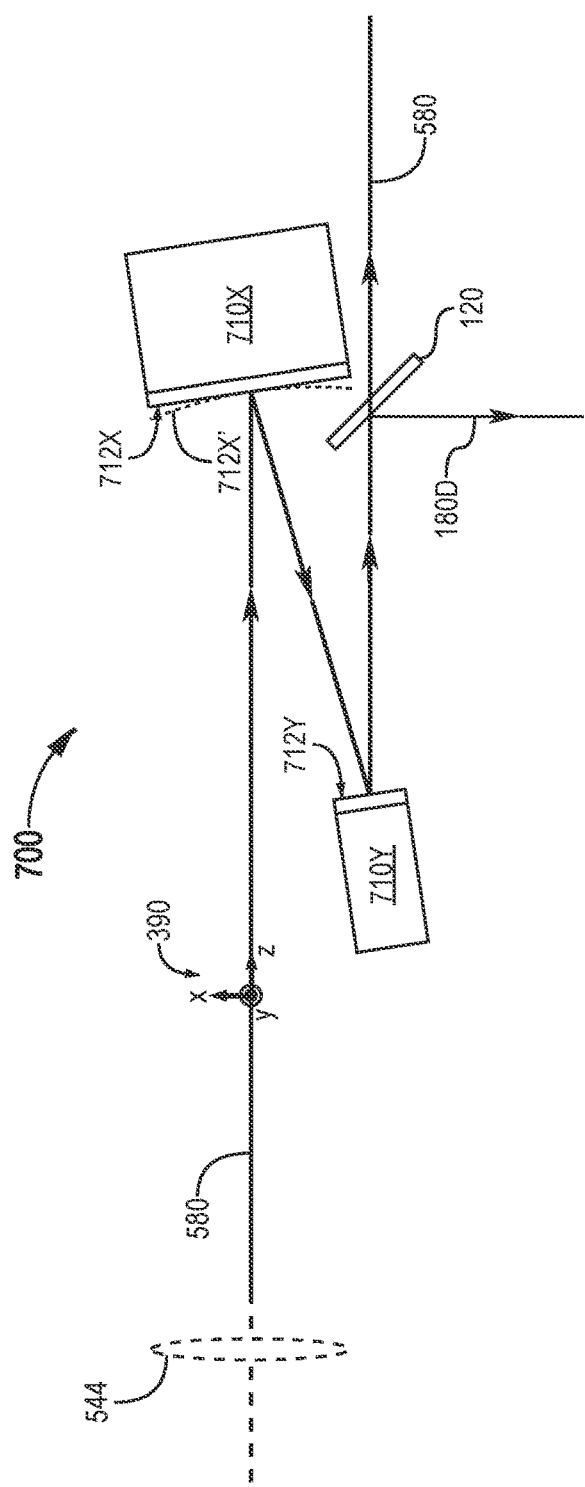
FIG. 7 illustrates an adaptive optics module configured to perform 2D wavefront correction in the system of FIG. 6, according to an embodiment.

FIG. 7 illustrates one adaptive optics module 700 configured to perform 2D wavefront correction in system 600. Adaptive optics module 700 is an embodiment of adaptive optic(s) 110. Adaptive optics module 700 includes adaptive cylindrical mirrors 710X and 710Y, arranged in series. Mirror 710X has a mirror surface 712X that is adjustable to change the wavefront of laser beam 580 in the x-axis. For example, mirror surface 712X may be adjusted from an initial planar shape to a cylindrical shape indicated by a dashed line 712X', so as to impart focusing on laser beam 580 in the x-axis. Similarly, mirror 710Y has a mirror surface 712Y that may be adjusted to change the wavefront of laser beam 580 in the y-axis (this adjustability is not in the plane of FIG. 7 and is therefore not depicted).

In an embodiment, the action of mirrors 710X and 710Y are decoupled from each other such that mirror 710X has no or at least only negligible effect on the y-axis of the wavefront, and mirror 710Y has no or at least only negligible effect on the x-axis of the wavefront. In this embodiment, for optimal decoupling between the x-axis and y-axis actions, mirrors 710X and 710Y may be advantageously arranged to fold the path of laser beam 580 in either the xy-plane (as depicted in FIG. 7) or in the yz-plane. Mirrors 710X and 710Y may be identical mirrors, with the orientation of mirror 710X about the z-axis being different from that of mirror 710Y, preferably by 90 degrees to decouple the action of mirror 710X from that of mirror 710Y.

Each of mirrors 710X and 710Y may be a deformable mirror with a flexible mirror surface, a support substrate, and a plurality of actuators therebetween. Since each of mirrors 710X and 710Y requires adjustment only in one axis, a 1D array of actuators suffices. The more complex, commercially available adaptive mirrors with 2D actuator arrays are not required in adaptive optics module 700.

Adaptive optics module 700 may be modified to perform 1D wavefront correction in laser apparatus 602. In this modification, adaptive optics module 700 omits one of mirrors 710X and 710Y. The omitted mirror may be replaced by a rigid mirror, for example a planar mirror.

Figure 8:
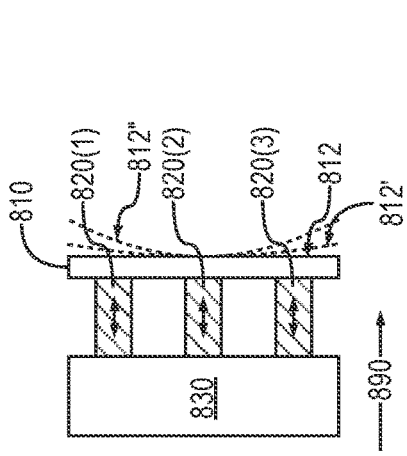
FIG. 8 illustrates a 3-actuator adaptive cylindrical mirror, according to an embodiment.

FIG. 8 illustrates one 3-actuator adaptive cylindrical mirror 800. Mirror 800 includes (a) a mirror substrate 810 with a mirror surface 812, (b) a support substrate 830, and (c) three actuators 820 connecting mirror substrate 810 to support substrate 830. The length of at least some of actuators 820 is adjustable in a direction 890. Direction 890 is generally orthogonal to mirror surface 812. Actuators 820 are distributed along a direction 892 that is orthogonal direction 890. In one embodiment, all actuators 820 have adjustable length. In another embodiment, only actuators 820(1) and 820(3) have adjustable length. In yet another embodiment, only actuator 820(2) has adjustable length. Each of these embodiments is capable of changing the radius of curvature of mirror surface 812. FIG. 8 depicts an example where actuators 820(1) and 820(3) are extended with respect to actuator 820(2) to change mirror surface 812 from an initial plane shape to a mildly concave shape 812' or to a more strongly concave shape 812". The radius of curvature of concave shape 812" is less than the radius of curvature of concave shape 812', and the radius of curvature of the initial planar shape is infinite. Mirror surface 812 may also attain a convex shape.

Each of mirrors 710X and 710Y in adaptive optics module 700 may be implemented as a respective mirror 800, with one of mirrors 710X and 710Y oriented with direction 892 parallel to the x-axis and the other one of mirrors 710X and 710Y oriented with direction 892 parallel to the y-axis. Since mirror 800 has only three actuators, mirror 800 may be produced at much lower cost than the current commercially available deformable mirrors that are equipped with a much higher number of actuators. Yet, we have found that the 3-actuator design of mirror 800 is, at least under most circumstances, sufficient for maintaining a waist of laser beam 580 at image plane 550 in laser apparatus 602.

Additional details of suitable adaptable mirrors can be found in co-pending U.S. patent application Ser. No. 17/101,783 filed Nov. 23, 2020, the disclosure of which is incorporated by reference.

Figure 9:
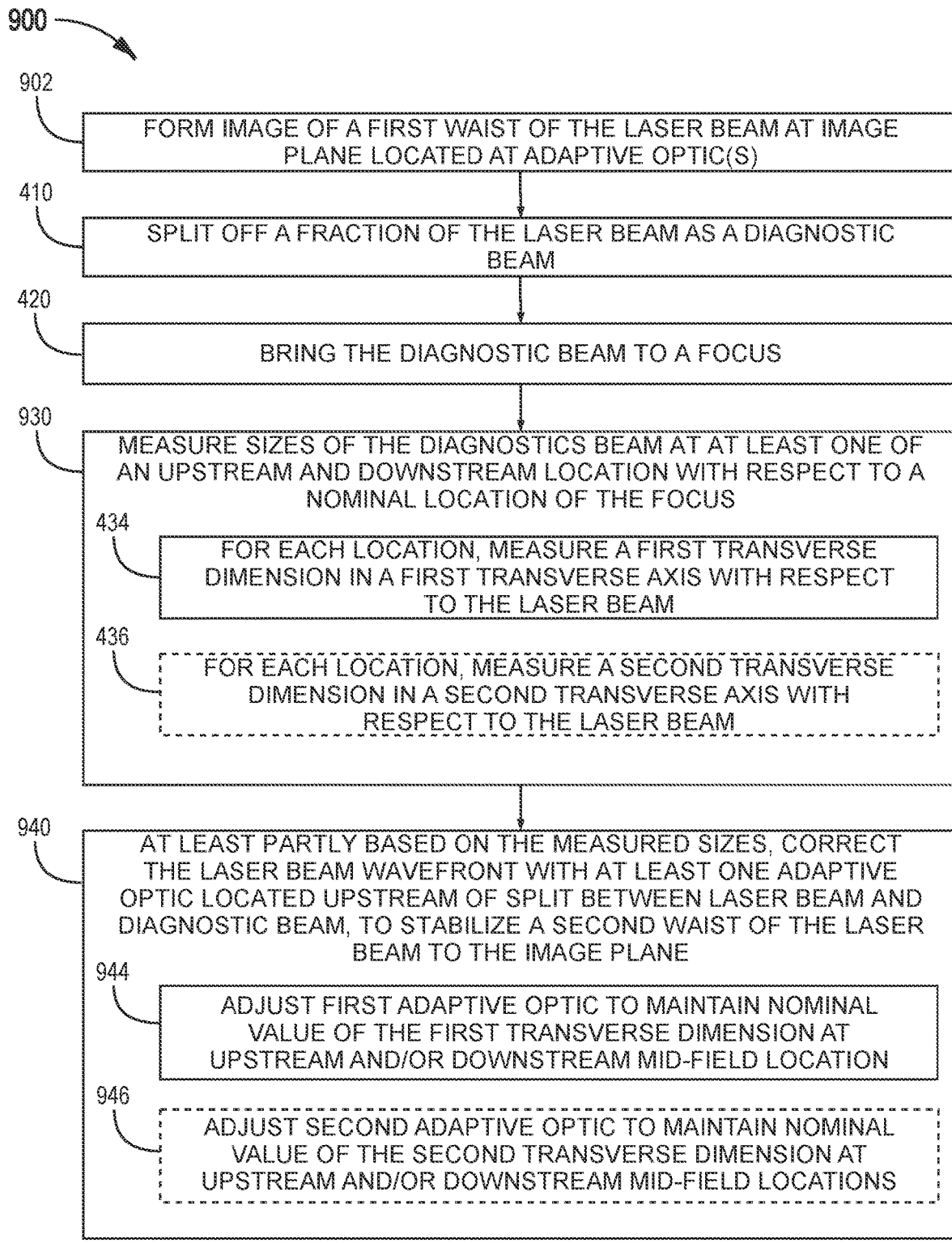
FIG. 9 illustrates a method for stabilizing a laser beam waist to an image plane of a telescope, with the use of one or more adaptive optics and based on mid-field beam size measurements, according to an embodiment.

FIG. 9 illustrates one method 900 for stabilizing a laser beam waist to an image plane of a telescope, with the use of one or more adaptive optics. Method 900 may be performed by telescope 540 and system 600 to stabilize waist $w_1$ of laser beam 580 to image plane 550 in laser apparatus 602, in the presence of wavefront deformation in laser source 570, for example caused by nonlinear crystal 172. Method 900 is an embodiment of method 400 that implements steps 930 and 940 in place of steps 430 and 440, respectively, and further includes a step 902.

Step 902 forms an image of a first waist of the laser beam at an image plane located at the adaptive optic(s). In one example of step 902, telescope 540 forms an image of waist $w_0$ at image plane 550, as discussed above in reference to FIG. 5.

Step 930 is an embodiment of step 430 that includes step 434. Step 930 may also include step 436 and, although not shown in FIG. 9, step 432.

Step 940 is an embodiment of step 440 that corrects the laser beam wavefront, with at least one adaptive optic, to stabilize a second waist of the laser beam to the image plane of step 902. In one example of step 940, feedback controller 160 adjusts one or more adaptive optics 110 to stabilize waist $w_1$ of laser beam 580 to image plane 550 in laser apparatus 602, as discussed above in reference to FIG. 6. Step 940 includes a step 944. Step 944 is an embodiment of step 444 that adjusts the first adaptive optic(s) to maintain nominal values of the first transverse dimensions at the upstream and downstream locations, so as to stabilize, in a first transverse axis with respect to the laser beam, the second waist to the image plane. Step 944 relies on measurements made in step 434. In one example of step 944, feedback controller 160 adjusts at least one first adaptive optic, e.g., mirror 710X, to maintain nominal values of transverse dimension 388X of spots 382S(1) and 382S(2) (see FIG. 3), thereby stabilizing, in the x-axis, waist $w_1$ of laser beam 580 to image plane 550. The adjustments in step 944 may be based on absolute values of the transverse dimensions, or on the ratio between the transverse dimensions measured at upstream and downstream locations, as discussed above in reference to FIG. 6. Step 940 may further include a step 946. Step 946 is similar to step 944, apart from acting on a second transverse axis, preferable orthogonal to the first transverse axis, e.g., the y-axis. Although not shown in FIG. 9, step 940 may further include step 442.

In a 1D wavefront correction implementation of method 900, step 940 omits step 946 and step 930 may omit step 436. In a 2D wavefront correction implementation of method 900, steps 930 and 940 include steps 436 and 946, respectively.

Figure 10:
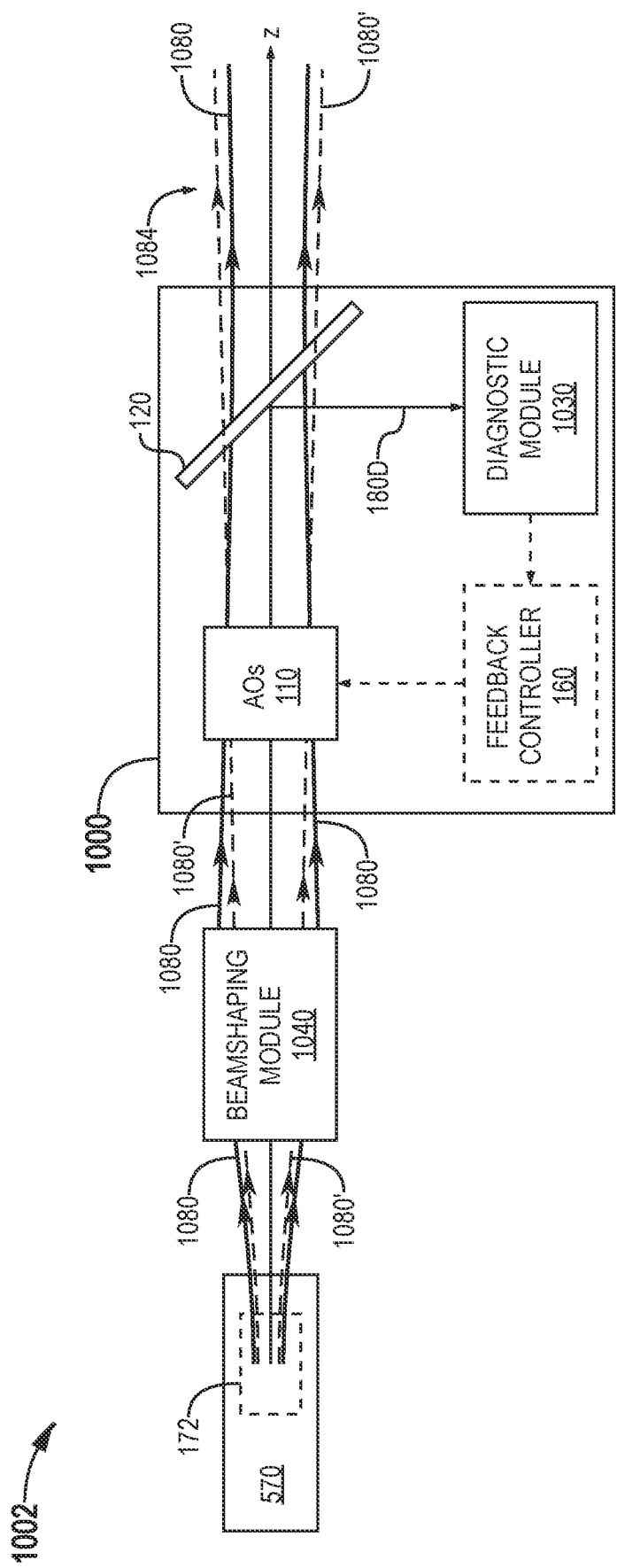
FIG. 10 illustrates a laser apparatus incorporating a wavefront correction system that uses mid-field and far-field beam size measurements, and adaptive optics, to stabilize size and divergence properties of a laser beam, according to an embodiment.

FIG. 10 illustrates one laser apparatus 1002 that uses mid-field and far-field beam size measurements, and adaptive optics, to stabilize size and divergence properties of a laser beam. Laser apparatus 1002 includes laser source 570, a beamshaping module 1040, and a wavefront correction system 1000. Beamshaping module 1040 is located between laser source 570 and wavefront-correction system 1000. Beamshaping module 1040 shapes a laser beam 1080 generated by laser source 570. Beamshaping module 1040 may include one or more lenses. When laser beam 1080 has nominal properties, beamshaping module 1040 achieves a set of pre-defined size and divergence properties of laser beam 1080. Wavefront correction system 1000 ensures that the pre-defined size and divergence properties are achieved also in the presence of wavefront deformation of laser beam 1080 in laser source 570. FIG. 10 depicts one example where laser source 570 generates a wavefront-deformed laser beam 1080' that does not have nominal wavefront properties at beamshaping module 1040 and therefore, without correction by system 1000, would fail to meet the pre-defined size and divergence properties after beamshaping by beamshaping module 1040. For example, as depicted in FIG. 10, wavefront-deformed laser beam 1080' might be larger and more divergent than the nominal laser beam 1080 at a downstream location 1084.

Wavefront correction system 1000 is an embodiment of system 100 that measures beam sizes at locations 152(1) and 152(2), as well as at focal plane 148. Wavefront correction system 1000 includes beamsplitter 120, a diagnostic module 1030, and a plurality of adaptive optics 110. Wavefront correction system 1000 may further include feedback controller 160. Diagnostic module 1030 is an embodiment of diagnostic module 130 specifically configured to measure beam sizes not only at locations 152(1) and/or 152(2) but also at focal plane 148. The $1/e^2$ beam radius $w_f$ at focal plane 148 relates to the $1/e^2$ far-field divergence angle $\theta_0$ through the relationship $w_f = \theta_0/f$, wherein f is the focal length of focusing element 140. In turn, the $1/e^2$ far-field divergence angle $\theta_0$ relates to the $1/e^2$ waist radius $w_0$ through the equation $\theta_0 = \lambda/(\pi w_0)$, wherein $\lambda$ is the wavelength of laser beam 1080. Therefore, with the additional availability of beam size measurement at focal plane 148, system 1000 is capable of not only stabilizing a waist location, but also stabilizing a waist size. Consequently, system 1000 is capable of maintaining a general set of pre-defined size and divergence properties of laser beam 1080. In the presence of wavefront deformation in laser source 570, system 1000 adjusts adaptive optics 110 based on the measured mid-field and far-field beam sizes, as imaged by focusing element 140, to impart compensating beamshaping. This compensating beamshaping cooperates with beamshaping module 1040 to achieve the pre-defined size and divergence properties of laser beam 1080 downstream of adaptive optics 110, even in the presence of wavefront deformation by beamshaping module 1040.

In contrast to telescope 540 of laser apparatus 502, beamshaping module 1040 does not need to form an image of a laser beam waist, and adaptive optics 110 do not need to be located at a corresponding image plane. As compared to laser apparatus 502, laser apparatus 1002 benefits from the additional availability of far-field beam size measurement, as imaged by focusing element 140, to maintain pre-defined size and divergence properties while accommodating more general beamshaping functionality. On the other hand, laser apparatus 1002 requires more adaptive optics 110 than laser apparatus 502, since system 1000 must be capable of adjusting both size and divergence angle of the laser beam.

In scenarios where the nominal waist radius $w_0$ of laser beam 1080 (as probed by diagnostic module 1000) is known, the beam quality factor $M^2$ of laser beam 580 may be derived from the relationship $M^2 = \pi w_0 \theta_0/\lambda$. In certain embodiments, adaptive optics 110 are configured to perform correction that minimizes $M^2$ or maintains a desired value thereof.

System 1000 may be provided as a standalone wavefront correction system configured for incorporation into a third-party laser apparatus including laser source 570 and beamshaping module 1040.

Figure 11:
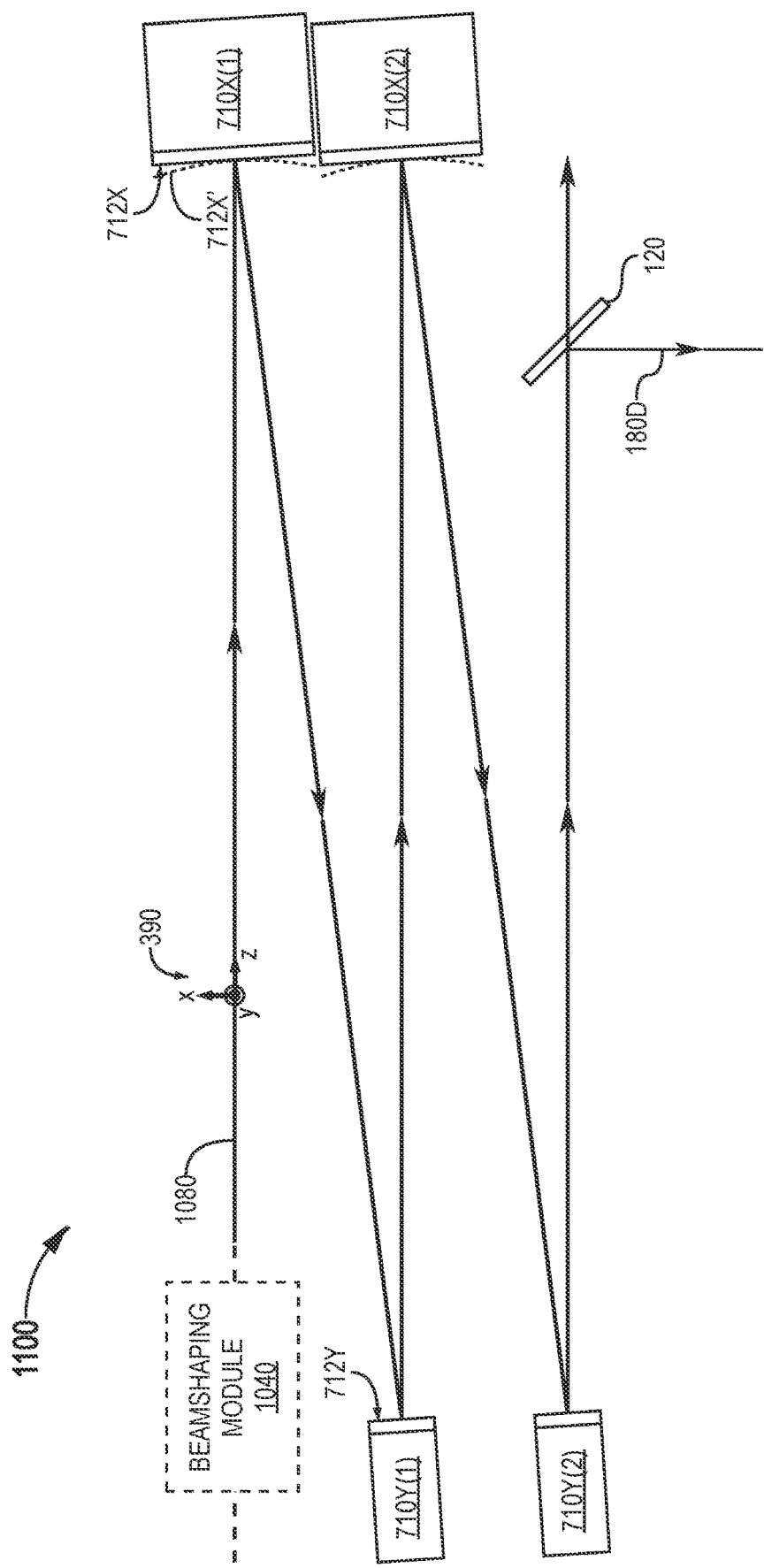
FIG. 11 illustrates an adaptive optics module configured to perform 2D wavefront correction in the wavefront correction system of the laser apparatus of FIG. 10, according to an embodiment.

FIG. 11 illustrates one adaptive optics module 1100 configured to perform 2D wavefront correction in system 1000. Adaptive optics module 1100 is an embodiment of adaptive optics 110. Adaptive optics module 1100 includes two adaptive cylindrical mirrors 710X, and two adaptive cylindrical mirrors 710Y, arranged in series. The order of the series may be different from that shown in FIG. 11.

In an embodiment, the action of mirrors 710X(1,2) is decoupled from that of mirrors 710Y(1,2), as discussed for mirrors 710X and 710Y in adaptive optics module 700. Mirrors 710X(1), 710X(2), 710Y(1), and 710Y(2) may be identical, with the orientation of mirrors 710X(1,2) about the z-axis being different from that of mirrors 710Y(1,2), preferably by 90 degrees to decouple the action of mirrors 710X(1,2) from that of mirrors 710Y(1,2). In each of the x-axis and the y-axis, the corresponding pair of mirrors 710X(1,2) or mirrors 710Y(1,2) provides the degrees of freedom to independently change both beam size and divergence, so as to achieve the pre-defined size and divergence properties of laser beam 1080.

Adaptive optics module 1100 may be modified to perform 1D wavefront correction in laser apparatus 1002. In this modification, adaptive optics module 1100 omits either mirrors 710X(1,2) or mirrors 710Y(1,2), and the remaining mirrors 710X(1,2) or 710Y(1,2) may be rearranged accordingly to simplify the path of laser beam 1080 through adaptive optics module 1100.

Referring again to system 1000 and laser apparatus 1002, in one scenario beamshaping module 1040 may be omitted and its function instead be performed by system 1000. In this scenario, adaptive optics 110 of system 1000 are adjustable about a "zero-point" configuration that achieves the pre-defined size and divergence properties under nominal conditions. There are, however, potential advantages to having both beamshaping module 1040 and adaptive optics 110 of system 1000. For example, if adaptive optics 110 are adaptive cylindrical mirrors, elimination of beamshaping module 1040 may necessitate operating at least some of the cylindrical mirrors with a relatively high curvature. With adaptive mirrors, it may be difficult to reach such high curvatures without introducing higher-order aberrations. Thus, it is likely that a higher beam quality is achievable when retaining beamshaping module 1040 for the zero-point beamshaping and utilizing adaptive optics 110 of system 1000 only for smaller corrections needed to stabilize the size and divergence properties in the presence of wavefront deformation.

Figure 12:
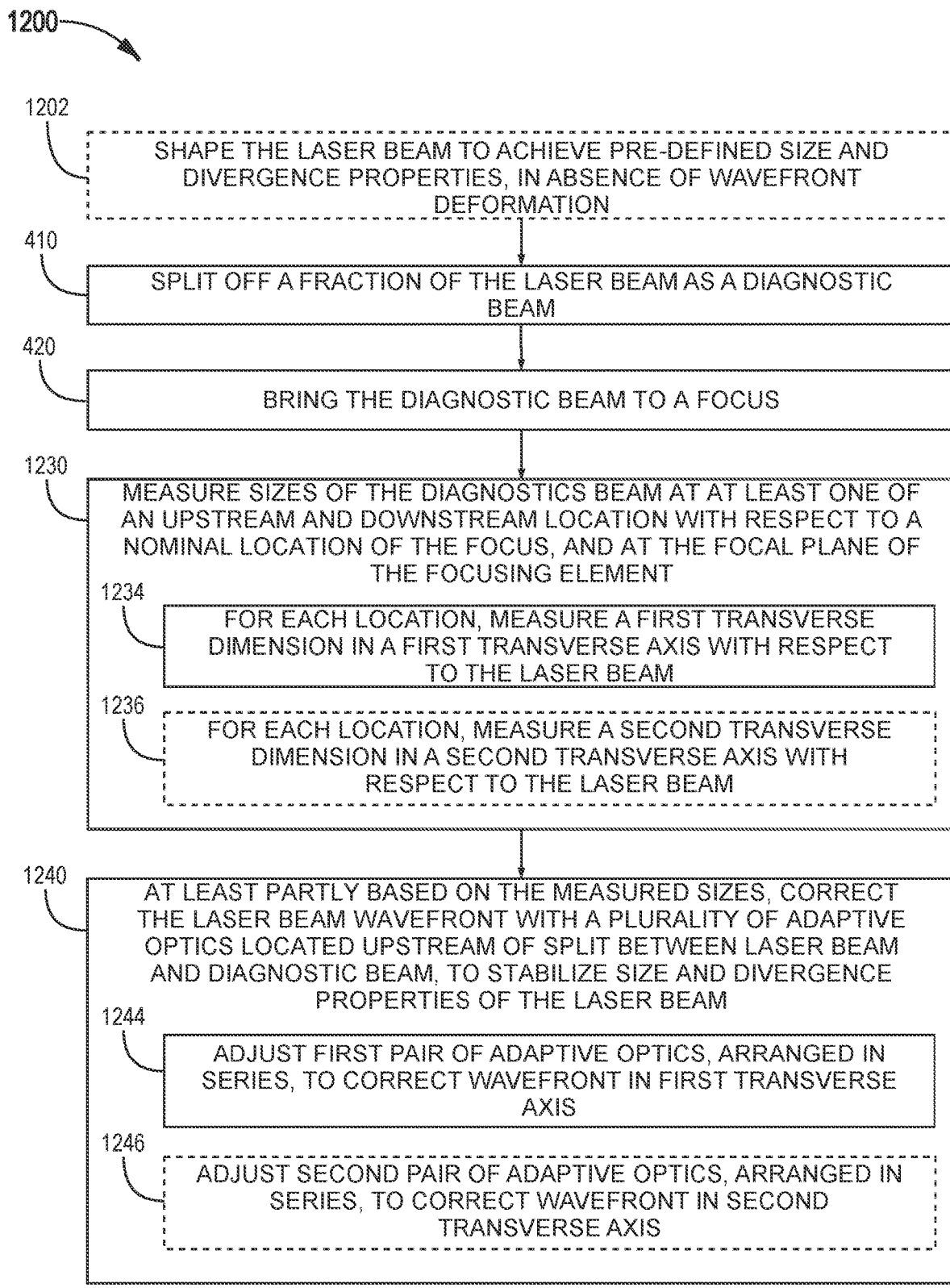
FIG. 12 illustrates a method for stabilizing size and divergence properties of a laser beam, with the use of one or more adaptive optics, according to an embodiment. The method utilizes beam size measurement in the mid-field and far-field.

FIG. 12 illustrates one method 1200 for stabilizing size and divergence properties of a laser beam, with the use of one or more adaptive optics. Method 1200 may be performed by wavefront correction system 1000 to maintain pre-defined size and divergence properties of laser beam 1080 in the presence of wavefront deformation in laser source 570, for example caused by nonlinear crystal 172. Method 900 is an embodiment of method 400 that implements steps 1230 and 1240 in place of steps 430 and 440, respectively.

Step 1230 is an extension of step 930 that further obtains one or more beam size measurements at the focal plane of the focusing element used to perform step 420, e.g., at focal plane 148. Step 1230 includes step 1234 and, optionally, also a step 1236. Steps 1234 and 1236 are extensions of steps 934 and 936, respectively, that further measure the respective transverse dimension at the focal plane. Step 1230 may implement step 432.

Step 1240 uses a plurality of adaptive optics, located upstream of the split between the laser beam and the diagnostic beam, to correct the laser beam wavefront so as to stabilize the size and divergence properties of the laser beam to a set of pre-defined size and divergence properties. Step 1240 includes a step 1244 and, optionally, also a step 1246. Step 1244 is an embodiment of step 444 that adjusts a first pair of adaptive optics to correct the laser beam wavefront in a first transverse axis. Step 1244 may achieve the needed wavefront correction by adjusting the first pair of adaptive optics in a manner that maintains nominal values of the first transverse dimension at the upstream location, the first transverse dimension at the downstream location, and the first transverse dimension at the focal plane. Step 1244 relies on measurements made in step 1234. In one example of step 1244, feedback controller 160 adjusts a first pair of adaptive optics, e.g., mirrors 710X(1) and 710X(2), to maintain nominal values of transverse dimensions 388X of spots 382S(1) and 382(2) and also maintain a nominal value of transverse dimension 388X of spot 384S (see FIG. 3). Feedback controller 160 thereby maintains the pre-defined size and divergence properties in the x-axis of laser beam 1080. Step 1246 is similar to step 1244, apart from acting on a second transverse axis, preferably orthogonal to the first transverse axis, e.g., the y-axis. Although not shown in FIG. 12, step 1240 may further include step 442.

Method 1200 may further include a step 1202 that shapes the laser beam to achieve the pre-defined size and divergence properties in the absence of wavefront deformation. In this embodiment, step 1240 imparts additional beamshaping that supplements the primary beamshaping in step 1202 to maintain the pre-defined size and divergence properties in the presence of wavefront deformation. Step 1202 may be performed by beamshaping module 1040.

In a 1D wavefront correction implementation of method 1200, step 1240 omits step 1246 and step 1230 may omit step 1236. In a 2D wavefront correction implementation of method 1200, steps 1230 and 1240 include steps 1236 and 1246, respectively.

As compared to method 900, method 1200 is more generally applicable as method 1200 does not require step 902 of forming the image of a waist. For example, method 1200 does not require that the laser apparatus is configured to form a waist image at image plane 550 as in laser apparatus 600. However, method 1200 also requires more complex wavefront correction, including measurement of beam size(s) at an additional location and use of at least one additional adaptive optic. Whereas wavefront correction in step 940 of method 900 may be performed using only a single adaptive optic per transverse axis, wavefront correction in step 1240 of method 1200 requires two adaptive optics per transverse axis.

Each of method 900, method 1200, system 600, and system 1000, as discussed above, primarily serve to provide a laser beam with stable size and divergence properties, in the presence of wavefront deformation. It is not uncommon that wavefront deformation causing changes in the size and/or divergence properties of a laser beam also introduces higher-order aberrations, such as a deviation in the power density distribution from either a TEM00 mode or another Hermite-Gaussian mode. For example, a nonlinear crystal, such as nonlinear crystal 172, may cause wavefront deformation that not only affects the size and divergence properties of the laser beam but also introduces higher-order aberrations. Each of method 900, method 1200, system 600, and system 1000 may be adapted to further correct for at least some forms of higher-order aberrations of the laser beam, for example to achieve a desired beam quality factor $M^2$. Such correction is not limited to the schemes of systems 600 and 1000 and methods 900 and 1200, but may be incorporated more generally in system 100 and method 400 by including beam size measurements at the focal plane of the focusing element (e.g., at focal plane 148). Systems 100, 600, and 1000 and methods 400, 900, and 1200 may also be configured to monitor higher-order aberrations and/or $M^2$ without implementing adaptive-optics-based correction thereof.

In the context of method 900, correction for higher-order aberrations may be achieved by (a) in step 930, additionally monitoring the higher-order transverse mode properties of the power density distribution of the diagnostic beam at the focal plane to detect higher-order aberrations, and (b) in step 940, further adjusting each adaptive optic according to the higher-order transverse mode properties. This adaption of method 900 may thus adjust the adaptive optic(s) in a manner that reduces or eliminates the higher-order aberrations. Method 1200 may be adapted in a similar fashion. In the context of system 600, diagnostic module 630 may further monitor higher-order transverse mode properties of the power density distribution of the diagnostic beam at the focal plane (for example using measurement subsystem 300 and image sensor 320), and adaptive optic(s) 110 may be further adjusted according to the higher-order transverse mode properties. This adaptation of system 600 may adjust adaptive optic(s) 110 in a manner that reduces or eliminates higher-order aberrations detected by diagnostic module 630, so as to reduce or eliminate corresponding higher-order aberrations in laser beam 580. System 1000 may be adapted in a similar fashion.

Figure 13:
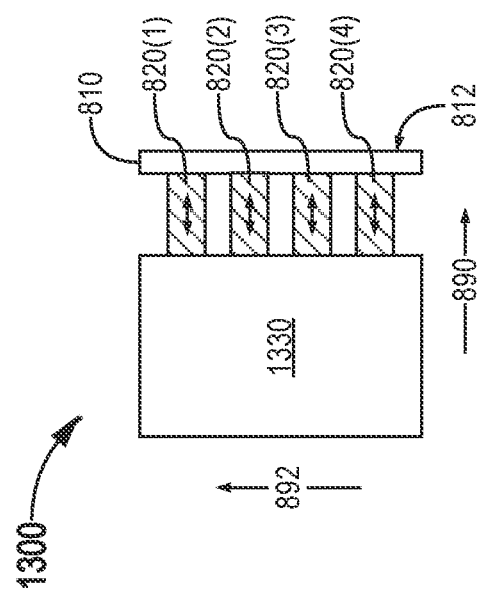
FIG. 13 illustrates a 4-actuator adaptive cylindrical mirror, according to an embodiment.

FIG. 13 illustrates one 4-actuator adaptive cylindrical mirror 1300. Mirror 1300 is an embodiment of either one of mirrors 710X and 710Y. Mirror 1300 is an extension of mirror 800 that includes four actuators 820. All four actuators 820 have adjustable length. Mirror 1300 has the functionality of mirror 800. In addition, by virtue of the one additional actuator 820, mirror 1300 is capable of imparting a higher-order wavefront correction, for example to reduce or eliminate a higher-order aberration in the laser beam. Mirror 1300 is thus suitable for use in either one of method 900, method 1200, system 600, and system 1000, adapted to further correct for higher-order aberrations.

Figure 14:
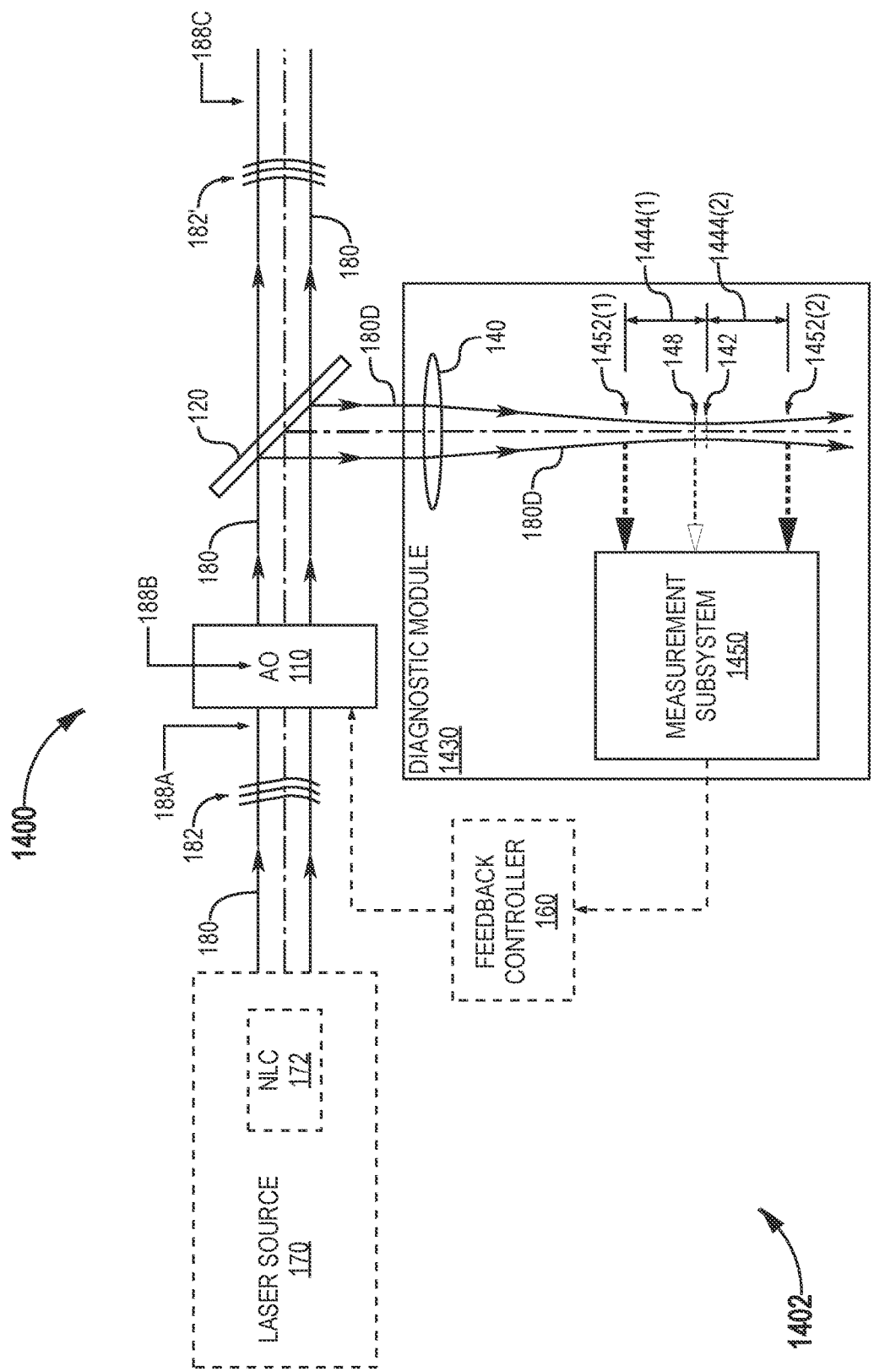
FIG. 14 illustrates another system for correcting the wavefront of a laser beam, according to an embodiment. The system utilizes beam size measurements in the mid-field of a diagnostic beam.

FIG. 14 illustrates another system 1400 for correcting the wavefront 182 of a laser beam 180. System 1400 is similar to system 1000 except for replacing diagnostic module 130 with a similar diagnostic module 1430 that measures beam size in the mid-field of diagnostic beam 180D instead of in the mid-field of laser beam 180. Diagnostic module 1430 is similar to diagnostic module 130 except for the upstream and downstream measurement locations being in the mid-field of diagnostic beam 180D, with respect to nominal focus location 142 of the waist of diagnostic beam 180D generated by focusing element 140. Depending on the location of waist 188 of laser beam 180 relative to focusing element 140, the upstream and downstream measurement locations of diagnostic module 1430 may differ significantly from those of diagnostic module 130, or be similar or even the same.

Diagnostic module 1430 implements a measurement subsystem 1450. Measurement subsystem 1450 is a modification of measurement subsystem 150 that measures a size of diagnostic beam 180D at each of an upstream mid-field location 1452(1) and a downstream mid-field location 1452(2) relative to nominal focus location 142. Upstream mid-field location 1452(1) is a distance 1444(1) upstream of nominal focus location 142. Downstream mid-field location 1452(2) is a distance 1444(2) downstream of nominal focus location 142. Each of distance 1444(1) and 1444(2) approximately equals the Rayleigh length $z_{RD}$ of diagnostic beam 180D. For example, distances 1444(1) and 1444(2) may be within 10% or 20% of Rayleigh length $z_{RD}$. Distances 1444(1) and 1444(2) may be identical.

By virtue of measurements being performed at upstream and downstream mid-field locations 1452(1) and 1452(2) of diagnostic beam 180D, measurement subsystem 1450 optimizes the sensitivity of its beam size measurements to shifts in the location of the waist of diagnostic beam 180D away from nominal focus location 142. The reasons for this optimal sensitivity are the same as the reasons for the optimal sensitivity of diagnostic module 130 to shifts of waist 188 of laser beam 180 away from its nominal location in laser beam 180. A more detailed discussion is found above in reference to FIGS. 2A and 2B.

System 1400 is an alternative to system 100 that is optimized to stabilize the position of the waist of diagnostic beam 180D to nominal focus location 142, regardless of where diagnostic module 1430 is located relative to waist 188 of laser beam 180. The sensitivity of diagnostic module 1430 to shifts in the location of waist 188 does, however, depend on where diagnostic module 1430 is located relative to waist 188. Optimal sensitivity of diagnostic module 1430 to shifts in the location of waist 188 is achieved when focusing element 140 is close to waist 188 because, in this situation, upstream mid-field location 1452(1) and downstream mid-field location 1452(2) are relatively close to upstream location 152(1) and downstream location 152(2), respectively.

Certain embodiments of diagnostic module 1430 are configured to also perform beam size measurements at focal plane 148 of focusing element 140, and/or measure other properties of diagnostic beam 180D at focal plane 148. Such embodiments of diagnostic model 1430 provide additional capability similar to that of embodiments of diagnostic module 130 configured to perform measurements at focal plane 148, as discussed above in reference to FIG. 1 for example.

Without departing from the scope hereof, method 400 may be modified to utilize beam size measurements in the mid-field of the diagnostic beam, for example by using diagnostic module 1450 in step 430.

The present invention is described above in terms of a preferred embodiment and other embodiments. The invention is not limited, however, to the embodiments described and depicted herein. Rather, the invention is limited only by the claims appended hereto.

What is claimed is:

1. A system for correcting a wavefront of a laser beam, comprising:
   a primary beamsplitter for splitting off a fraction of the laser beam to be used as a diagnostic beam, the laser beam having a waist at a nominal waist location;
   a focusing element for bringing the diagnostic beam to a focus;
   a measurement subsystem configured to measure a size of the diagnostic beam at at-least one of an upstream and a downstream location with respect to a nominal location of the focus of the diagnostic beam, wherein each of the upstream and downstream locations of the diagnostic beam corresponds to an image of a respective mid-field location of the laser beam, wherein each of the mid-field locations is displaced from the nominal waist location by between 80% and 120% of a nominal Rayleigh length of the laser beam with respect to the nominal waist location; and
   at least one adaptive optic, located in the laser beam upstream from the primary beamsplitter, for correcting the wavefront of the laser beam at least partly based on the measured sizes of the diagnostic beam for the at-least one of the upstream and downstream locations.

2. The system of claim 1, wherein:
the at least one adaptive optic includes a first adaptive mirror configured to correct the wavefront in a first transverse axis with respect to the laser beam; and
at each of the at-least one of the upstream and downstream locations, the corresponding size measured by the measurement subsystem includes a first transverse dimension of the diagnostic beam in the first transverse axis.

3. The system of claim 2, wherein the first adaptive mirror includes:
a mirror surface, and
only three actuators, the three actuators being distributed along the first transverse axis to adjust the mirror surface in dimensions parallel to a plane defined by the first transverse axis and propagation direction of the laser beam.

4. The system of claim 2, wherein the measurement subsystem includes:
an image sensor; and
first and second secondary beamsplitters for directing respective first and second fractions of the diagnostic beam to different respective first and second locations on the image sensor, the first and second secondary beamsplitters being arranged in series such that the image sensor intercepts the first and second fractions of the diagnostic beam at the upstream location and the downstream location, respectively.

5. The system of claim 2, wherein:
the at least one adaptive optic further includes a second adaptive mirror downstream from the first adaptive mirror and configured to correct the wavefront in a second transverse axis with respect to the laser beam, the second transverse axis being orthogonal to the first transverse axis; and
at each of the at-least one of the upstream and downstream locations, the corresponding size measured by the measurement subsystem further includes a second transverse dimension of the diagnostic beam in the second transverse axis.

6. A laser apparatus with wavefront correction, comprising:
the system of claim 5;
a laser source for generating the laser beam with a waist at a waist location within the laser source; and
upstream of the at least one adaptive optic, a telescope for forming, at an image plane, an image of the laser beam at the waist location;
wherein the at least one adaptive optic is located at the image plane.

7. The laser apparatus of claim 6, wherein the laser source includes a nonlinear crystal and the waist location is within the nonlinear crystal.

8. The system of claim 6, further comprising:
a feedback controller configured to actively adjust the at least one adaptive optic to maintain nominal values of the sizes measured for the at-least one of the upstream and downstream locations, so as to stabilize location of a second waist of the laser beam at the image plane.

9. The system of claim 1, wherein the measurement subsystem is configured to further measure a size of the diagnostic beam at a focal plane of the focusing element.

10. The system of claim 9, wherein the measurement subsystem includes:
an image sensor; and
first, second, and third secondary beamsplitters for directing respective first, second, and third fractions of the diagnostic beam to different respective first, second, and third locations on the image sensor, the first, second, and third secondary beamsplitters being arranged in series such that the image sensor intercepts the first, second, and third fractions of the diagnostic beam at the upstream location, the focal plane, and the downstream location, respectively.

11. The system of claim 9, further comprising:
a feedback controller configured to actively adjust the at least one adaptive optic to maintain nominal values of the sizes measured for the at-least one of the upstream and downstream locations and at the focal plane.

12. The system of claim 9, wherein the at least one adaptive optic includes a first pair of adaptive mirrors arranged in series and each configured to correct the wavefront in a first transverse axis with respect to the laser beam.

13. The system of claim 12, wherein each adaptive mirror of the first pair includes:
a mirror surface, and
only three actuators, the three actuators being distributed along the first transverse axis to adjust the mirror surface in dimensions parallel to a plane defined by the first transverse axis and propagation direction of the laser beam.

14. The system of claim 12, wherein the at least one adaptive optic further includes a second pair of adaptive mirrors arranged in series and each configured to correct the wavefront in a second transverse axis with respect to the laser beam, the second transverse axis being orthogonal to the first transverse axis.

15. A laser apparatus with wavefront correction, comprising:
the system of claim 14;
a laser source for generating the laser beam;
upstream of the at least one adaptive optic, a beamshaping module configured to, when the wavefront has nominal properties at the beamshaping module, achieve pre-defined waist size and far-field divergence of the laser beam; and
a feedback controller configured to adjust the first and second pairs of adaptive optics, at least partly based on the measured sizes of the diagnostic beam for the at-least one of the upstream and downstream locations and at the focal plane, to achieve the pre-defined waist size and far-field divergence of the laser beam when the wavefront does not have the nominal properties at the beamshaping module.

16. The laser apparatus of claim 15, wherein the laser source includes a nonlinear crystal.

17. A method for correcting a wavefront of a laser beam, comprising steps of:
splitting off a fraction of the laser beam as a diagnostic beam, the laser beam having a waist at a nominal waist location;
bringing the diagnostic beam to a focus;
measuring a size of the diagnostic beam at at-least one of an upstream and a downstream location with respect to a nominal location of the focus of the diagnostic beam, wherein each of the upstream and downstream locations of the diagnostic beam corresponds to an image of a respective mid-field location of the laser beam, wherein each of the mid-field locations is displaced from the nominal waist location by between 80% and 120% of a nominal Rayleigh length of the laser beam with respect to the nominal waist location; and correcting, at least partly based on the sizes measured for the at-least one of the upstream and downstream locations, the wavefront of the laser beam with at least one adaptive optic located in the laser beam upstream of the split between the laser beam and the diagnostic beam.

18. The method of claim 17, wherein the laser beam has a first waist, the method further comprising steps of:

forming an image of the first waist at an image plane located at the at least one adaptive optic;

in the measuring step, measuring a first transverse dimension of the diagnostic beam at the at-least one of the upstream and downstream locations in a first transverse axis with respect to the laser beam; and in the correcting step, adjusting a first adaptive mirror to maintain nominal values of the first transverse dimension for the at-least one of the upstream and downstream locations so as to stabilize, to the image plane, location of a second waist of the laser beam in the first transverse axis.

19. The method of claim 18, wherein the first waist is in a nonlinear crystal and the correcting step stabilizes the location of the second waist in presence of wavefront deformation of the laser beam in the nonlinear crystal.

20. The method of claim 18, wherein the measuring step comprises steps of:

directing, using two beamsplitters arranged in series along the diagnostic beam, two different respective fractions of the diagnostic beam to two different respective locations on a single image sensor, such that image sensor intercepts the two different respective fractions at the upstream location and the downstream location, respectively; and extracting, from an image captured by the image sensor, the size of the diagnostic beam at each of the upstream location and the downstream location.

21. The method of claim 18, further comprising steps of:

in the measuring step, measuring a second transverse dimension of the diagnostic beam at each of the upstream and downstream locations in a second transverse axis with respect to the laser beam, the second transverse axis being orthogonal to the first transverse axis; and in the correcting step, adjusting a second adaptive mirror to maintain nominal values of the second transverse dimension at the upstream and downstream locations so as to stabilize, to the image plane, the location of the second waist of the laser beam in the second transverse axis.

22. The method of claim 17, wherein:

a focusing element performs the step of bringing the diagnostic beam to a focus;

the measuring step further includes a step of measuring a size of the diagnostic beam at a focal plane of the focusing element; and the correcting step further bases correction of the wavefront on the size of the diagnostic beam measured at the focal plane.

23. The method of claim 22, wherein the correcting step adjusts a plurality of adaptive optics to maintain pre-defined waist size and far-field divergence of the laser beam.

24. The method of claim 23, further comprising steps of:

generating the laser beam by frequency conversion in a nonlinear crystal; and shaping the laser beam upstream of the plurality of adaptive optics, the shaping being configured to achieve the pre-defined waist size and far-field divergence of the laser beam in the absence of wavefront deformation by the nonlinear crystal;

wherein the correcting step imparts additional shaping to correct for presence of wavefront deformation by the nonlinear crystal.

25. The method of claim 22, wherein:

the measuring step measures, in a first transverse axis with respect to the laser beam, a first transverse dimension of the diagnostic beam at each of the at-least one of the upstream and downstream locations and the focal plane; and the correcting step adjusts, based on the first transverse dimensions, a first pair of adaptive mirrors, arranged in series, to maintain (a) a pre-defined location of a waist, in the first transverse axis, of the laser beam and (b) a pre-defined size, in the first transverse axis, of the waist.

26. The method of claim 25, wherein:

the measuring step further measures, in a second transverse axis with respect to the laser beam, a second transverse dimension of the diagnostic beam at each of the at-least one of the upstream and downstream locations and the focal plane, the second transverse axis being orthogonal to the first transverse axis; and the correcting step further adjusts, based on the second transverse dimensions, a first pair of adaptive mirrors, arranged in series, to maintain (a) a pre-defined location of a waist, in the second transverse axis, of the laser beam and (b) a pre-defined size, in the second transverse axis, of the waist.

27. The method of claim 22, wherein the measuring step comprises steps of:

directing, using three beamsplitters arranged in series, three different respective fractions of the diagnostic beam to three different respective locations on a single image sensor, such that image sensor intercepts the three different respective fractions at the upstream location, the focal plane, and the downstream location, respectively; and extracting, from an image captured by the image sensor, the size of the diagnostic beam at each of the upstream location, the focal plane, and the downstream location.

28. The method of claim 22, further comprising steps of:

in the measuring step, monitoring higher-order transverse mode properties of the diagnostic beam at the focal plane; and in the correcting step, further adjusting the at least one adaptive optic according to the higher-order transverse mode properties.

* * * * *